(12) United States Patent
Baheti et al.

(10) Patent No.: US 8,625,902 B2
(45) Date of Patent: Jan. 7, 2014

(54) OBJECT RECOGNITION USING INCREMENTAL FEATURE EXTRACTION

(75) Inventors: Pawan Kumar Baheti, Bangalore (IN); Sundeep Vaddadi, San Diego, CA (US); Ashwin Swaminathan, San Diego, CA (US); Yuriy Reznik, Seattle, WA (US); Onur C. Hamsici, San Diego, CA (US); Murali Ramaswamy Chari, San Diego, CA (US); John H. Hong, San Diego, CA (US); Chong Uk Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 13/193,294

(22) Filed: Jul. 28, 2011

(65) Prior Publication Data

US 2012/0027290 A1    Feb. 2, 2012

Related U.S. Application Data

(60) Provisional application No. 61/369,228, filed on Jul. 30, 2010.

(51) Int. Cl.
*G06K 9/66* (2006.01)
*G06K 9/60* (2006.01)

(52) U.S. Cl.
USPC .......................................... 382/190; 382/305

(58) Field of Classification Search
USPC ......... 382/162, 165, 190, 195, 225, 275, 279, 382/305, 306; 707/6, 104, 736, 771, 707/E17.014
See application file for complete search history.

(56) References Cited

U.S. PATENT DOCUMENTS

| 5,850,490 | A | * | 12/1998 | Johnson | 382/306 |
| 5,852,823 | A | * | 12/1998 | De Bonet | 382/279 |
| 6,236,768 | B1 | * | 5/2001 | Rhodes et al. | 382/306 |
| 6,304,197 | B1 | | 10/2001 | Freking et al. | |

(Continued)

FOREIGN PATENT DOCUMENTS

| WO | 2008087466 A1 | 7/2008 |
| WO | 2010141474 A1 | 12/2010 |
| WO | 2010141926 A1 | 12/2010 |

OTHER PUBLICATIONS

Lowe, D.G., "Distinctive image features from scale invariant keypoints," IJCV 60(2), 91-110 (2004).*

(Continued)

*Primary Examiner* — Andrae S Allison
(74) *Attorney, Agent, or Firm* — Shumaker & Sieffert, P.A.

(57) ABSTRACT

In one example, an apparatus includes a processor configured to extract a first set of one or more keypoints from a first set of blurred images of a first octave of a received image, calculate a first set of one or more descriptors for the first set of keypoints, receive a confidence value for a result produced by querying a feature descriptor database with the first set of descriptors, wherein the result comprises information describing an identity of an object in the received image, and extract a second set of one or more keypoints from a second set of blurred images of a second octave of the received image when the confidence value does not exceed a confidence threshold. In this manner, the processor may perform incremental feature descriptor extraction, which may improve computational efficiency of object recognition in digital images.

50 Claims, 6 Drawing Sheets

(56) References Cited

U.S. PATENT DOCUMENTS

| | | | |
|---|---|---|---|
| 6,711,293 | B1 | 3/2004 | Lowe |
| 7,787,711 | B2* | 8/2010 | Agam et al. .................. 382/305 |
| 8,396,331 | B2* | 3/2013 | Jia et al. ........................ 382/305 |
| 2007/0092143 | A1* | 4/2007 | Higgins ........................ 382/228 |
| 2008/0013836 | A1 | 1/2008 | Nakamura et al. |
| 2008/0111721 | A1 | 5/2008 | Reznik |
| 2008/0192998 | A1 | 8/2008 | Takeguchi et al. |
| 2008/0205770 | A1* | 8/2008 | Jia et al. ........................ 382/217 |
| 2010/0303354 | A1 | 12/2010 | Reznik |
| 2010/0310174 | A1 | 12/2010 | Reznik |
| 2011/0314059 | A1* | 12/2011 | Hu ................................ 707/771 |
| 2012/0263388 | A1* | 10/2012 | Vaddadi et al. ............... 382/225 |

OTHER PUBLICATIONS

Bhatia, S.: Hierarchical clustering for image databases. In: Intl. Conference on Electro Information Technology, pp. 6-12 (2005).*

Shyu et al, A unified framework for image database clustering and content-based retrieval, in Proc. of the Second ACM International Workshop on Multimedia Databases (ACM MMDB), 2004.*

Krishnamachari et al, Santhana Krishnamachari and Mohamed Abdel-Mottaleb "Hierarchical clustering algorithm for fast image retrieval", Proc. SPIE 3656, Storage and Retrieval for Image and Video Databases VII, 427 (Dec. 17, 1998).*

Van Gemert et al., "Kernel Codebooks for Scene Categorization," Oct. 12, 2008, ECCV 2008, pp. 696-709.

Nowak et al., "Sampling Strategies for Bag-of-Features Image Classification," Jan. 1, 2006, ECCV 2006, pp. 490-503.

Zhu et al., "Keyblock: An approach for content-based image retrieval," Proceedings of the eighth ACM international conference on Multimedia 2000, pp. 157-166.

Chen et al, "Tree Histogram Coding for Mobile Image Matching," Data Compression Conference, Mar. 16, 2009, pp. 143-152.

Chandrasekhar et al., "CHoG: Compressed Histogram of Gradients: A Low Bit-Rate Feature Descriptor," CVPR 2009 papers on the web May 4, 2009.

Yeo et al., "Rate-efficient visual correspondences using random projections," Image Processing ICIP 2008, Oct. 12, 2008, pp. 217-220.

Sakaguchi et al., "A context tree weighting algorithm with a finite window," Electronics and Communications in Japan (Part III: Fundamental Electronic Science), vol. 83, No. 1, 2000, pp. 21-30.

Makar et al., "Compression of image patches for local feature extraction," ICASSP 2009, Apr. 19, 2009, pp. 821-824.

Varshney et al., "Benefiting from disorder: Source coding for Unordered Data," Feb. 1, 2008, http://arxiv.org/PS_cache/arxiv/pdf/0708/0708.2310v1.pdf.

Willems et al., "Complexity Reduction of Context-Tree Weighting Algorithm: A Study for KPN Research," Oct. 17, 1995, www.ele.tue.nl/ctw/download/eidma.pdf.

International Search Report and Written Opinion of international application No. PCT/US2011/045942, dated Apr. 26, 2012, 12 pp.

Lee, S. et al., "Familiarity based unified visual attention model for fast and robust object recognition," Pattern Recognition, Elsevier, Jul. 2009, 13 pp.

Fritz et al., "A Mobile System for Urban Detection with Informative Local Descriptors," Proceedings of the Fourth IEEE International Conference on Computer Vision Systems, 2006, 9 pp.

Wagner et al., "Real-Time Detection and Tracking for Augmented Reality on Mobile Phones," IEEE Transactions on Visualization and Computer Graphics, vol. 16, No. 3, May/Jun. 2010, 14 pp.

Hoffmann et al., "Identification of Paintings in Camera-Phone Images," Identification of Paintings in Camera-Phone Images, 2007, http://www.stanford.edu/class/ee368/Project_07/reports/ee368group04.pdf, 6 pp.

Vaddadi et al., "Keypoint Clustering for Robust Image Matching," Proc. SPIE vol. 7798, Applications of Digital Image Processing, San Diego, CA, Aug. 2010, 12 pp.

U.S. Appl. No. 13/158,013, by Yuriy Reznik, filed Jun. 10, 2011.

* cited by examiner

OBJECT RECOGNITION USING INCREMENTAL FEATURE EXTRACTION

CLAIM OF PRIORITY UNDER 35 U.S.C. §119

This application claims the benefit of U.S. Provisional Application No. 61/369,228, filed Jul. 30, 2010, which is incorporated by reference in its entirety.

TECHNICAL FIELD

This disclosure relates to image processing systems and, more particularly, object recognition in images.

BACKGROUND

Visual search in the context of computing devices or computers refers to techniques that enable a computer or other device to provide identifying information for objects in one or more images. Recent interest in visual search has resulted in algorithms that enable computers to identify partially occluded objects and/or features in a wide variety of changing image conditions, including changes in image scale, noise, illumination, and local geometric distortion. During this same time, mobile devices that include cameras have emerged, but such mobile devices may have limited user interfaces for entering text or otherwise interfacing with the mobile devices. Developers of mobile devices and mobile device applications have sought to utilize the camera of the mobile device to enhance user interactions with the mobile device.

To illustrate one enhancement, a user of a mobile device may use a camera of the mobile device to capture an image of any given product while shopping at a store. The mobile device may then initiate a visual search algorithm within a set of archived feature descriptors for various images to identify the product based on matching imagery. After identifying the product, the mobile device may then initiate an Internet-based search and present a webpage that contains information about the identified product, which may include, for example, a lowest cost for which the product is available from nearby merchants and/or online merchants. In another example, object recognition may be used to generate supplemental information, which can be overlayed in the display of the mobile device to achieve so-called augmented reality.

SUMMARY

In general, this disclosure describes techniques for object identification in digital images. These techniques may reduce the computational complexity of identifying objects in an image. Rather than extracting feature descriptors from a predetermined number of octaves, the techniques of this disclosure provide for incremental feature descriptor extraction, progressing through the octaves. Moreover, this disclosure provides techniques for selecting a starting octave and techniques for selecting subsequent octaves from which to extract feature descriptors.

In one example, a method includes extracting a first set of one or more keypoints from a first set of blurred images of a first octave of a received image, calculating a first set of one or more descriptors for the first set of keypoints, receiving a confidence value for a result produced by querying a feature descriptor database with the first set of descriptors, wherein the result comprises information describing an identity of an object in the received image, and extracting a second set of one or more keypoints from a second set of blurred images of a second octave of the received image when the confidence value does not exceed a confidence threshold.

In another example, an apparatus includes a processor configured to extract a first set of one or more keypoints from a first set of blurred images of a first octave of a received image, calculate a first set of one or more descriptors for the first set of keypoints, receive a confidence value for a result produced by querying a feature descriptor database with the first set of descriptors, wherein the result comprises information describing an identity of an object in the received image, and extract a second set of one or more keypoints from a second set of blurred images of a second octave of the received image when the confidence value does not exceed a confidence threshold.

In another example, an apparatus includes means for extracting a first set of one or more keypoints from a first set of blurred images of a first octave of a received image, means for calculating a first set of one or more descriptors for the first set of keypoints, means for receiving a confidence value for a result produced by querying a feature descriptor database with the first set of descriptors, wherein the result comprises information describing an identity of an object in the received image, and means for extracting a second set of one or more keypoints from a second set of blurred images of a second octave of the received image when the confidence value does not exceed a confidence threshold.

In another example, a computer program product includes a computer-readable medium having stored thereon instructions that, when executed, cause a processor to extract a first set of one or more keypoints from a first set of blurred images of a first octave of a received image, calculate a first set of one or more descriptors for the first set of keypoints, receive a confidence value for a result produced by querying a feature descriptor database with the first set of descriptors, wherein the result comprises information describing an identity of an object in the received image, and extract a second set of one or more keypoints from a second set of blurred images of a second octave of the received image when the confidence value does not exceed a confidence threshold.

The details of one or more examples are set forth in the accompanying drawings and the description below. Other features, objects, and advantages will be apparent from the description and drawings, and from the claims.

DETAILED DESCRIPTION

Figure 1:
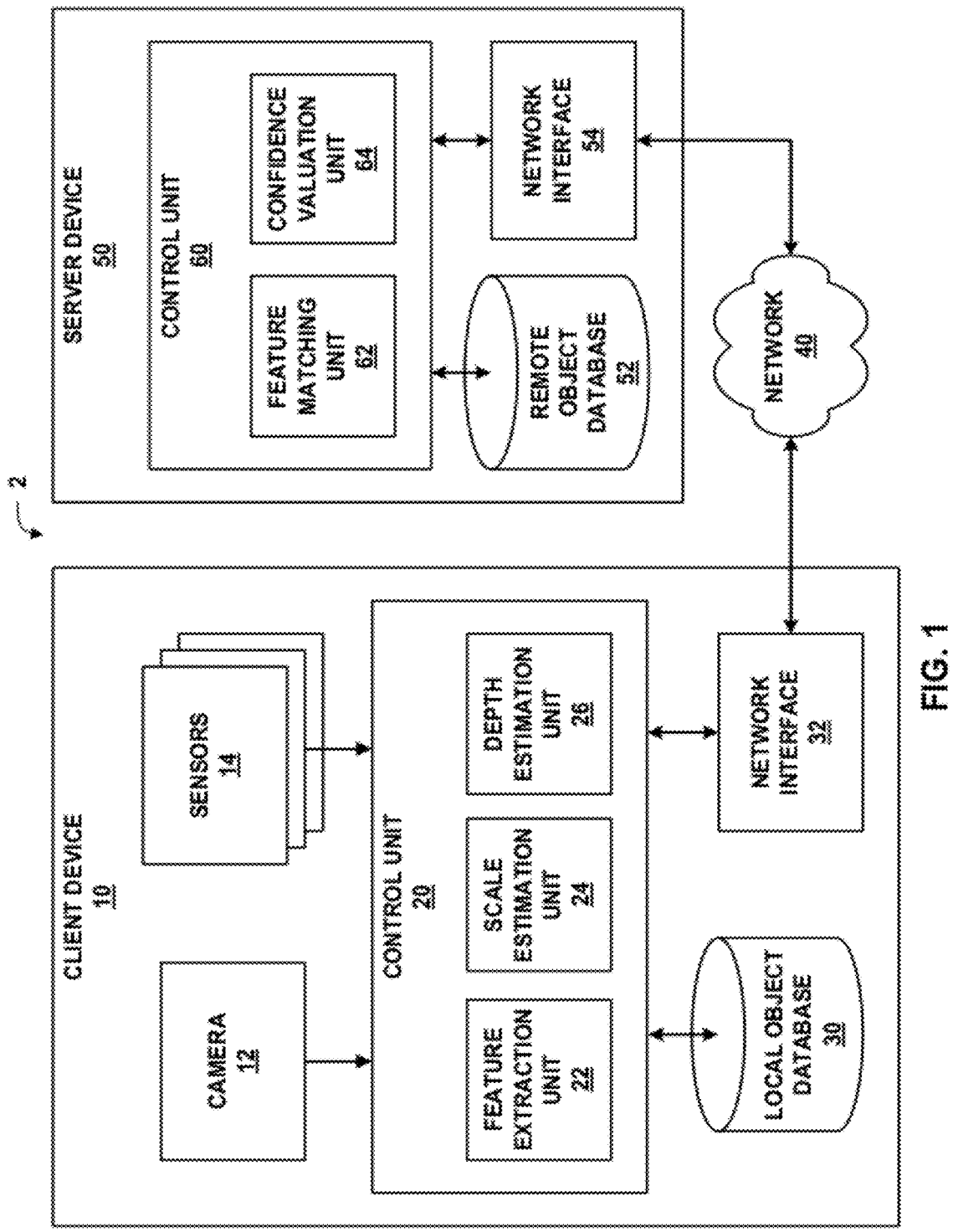
FIG. 1 is a block diagram illustrating an example system in which techniques for incremental feature descriptor extraction may be applied.

In general, this disclosure describes techniques for object identification in digital images. These techniques may reduce the computational complexity of identifying objects in an image. Rather than extracting feature descriptors from a predetermined number of octaves, the techniques of this disclosure provide for incremental feature descriptor extraction, progressing through the octaves. Feature descriptors may generally be extracted from one or more octaves, where each octave corresponds to a particular size (e.g., pixel resolution) of the image. For a given octave, the input image may be scaled to a size associated with the resolution. A plurality of increasingly more Gaussian-blurred images may then be formed, each having the resolution associated with the octave. These increasingly more blurry images for the octave may be analyzed to extract feature descriptors.

Rather than extracting feature descriptors for a predetermined number of octaves, the techniques of this disclosure are directed to extracting feature descriptors for a first octave, then attempting to detect an object in the image based on this first set of feature descriptors. If the object can be detected using these feature descriptors, then no further octaves need to be analyzed. However, if the object cannot be determined from the first octave, feature descriptors may be extracted from a subsequent octave.

Moreover, this disclosure provides techniques for selecting a starting octave and techniques for selecting subsequent octaves from which to extract feature descriptors. Various factors may be used to select the starting octave. For example, a scaling factor for the image may first be estimated based on, for example, whether the image was captured indoors or outdoors, and/or a depth of objects in the image relative to the camera used to capture the image (that is, the distance from the camera to the objects in the image).

A device including the camera, e.g., a mobile device such as a smartphone, tablet computing device, laptop computer, or other mobile device, may also include sensors that can be used to estimate whether the device was indoors or outdoors when the image was captured. For example, a global positioning system (GPS) unit may provide information indicating the location of the camera when the image was captured, which may be used to determine whether the camera was indoors or outdoors. As another example, if the device included a wireless network interface that was connected to a wireless access point when the image was captured, this may be used as a factor in favor of estimating that the device was indoors when the camera was captured. As still another example, depth information for objects in the image may be determined, e.g., when the device has a stereo camera arrangement.

In some examples, the device may include depth estimation units configured to estimate depths for objects in the image, in addition to or in the alternative to the depth estimation performed using a stereo camera arrangement. For example, the device may include a depth estimation unit that collects measurement data from one or more infrared sensors to estimate relative depths of objects in the scene. As another example, the device may include active probing sensors, such as a light detection and ranging (LIDAR) unit, for estimating depths of objects in an image. The LIDAR unit may use ultraviolet, visible, or infrared light to image the objects and process returned signals to estimate depths for the objects. These depth estimation units may be used alone or in any combination with each other to estimate depths of objects in an image. The depth estimation units may operate substantially simultaneously with a camera capturing the image, such that the units may determine depths for objects in the image captured by the camera without actually processing image data from the camera.

The device may include configuration data that associates various factors, e.g., based on the image and additional sensors of the device, with an estimated object scale. For example, the configuration data may map particular starting octaves and scales to various location cells (or "loxels") for the object (that is, loxels in which the object may occur). As an example, usage statistics may provide an estimate for the most likely scales and/or octaves when an object occurs in a given loxel, to determine a starting scale and/or octave, as well as subsequent scales and/or octaves. In other words, in some examples, the techniques of this disclosure may select a starting octave and/or scale for an object (as well as subsequent octaves) based on the loxel in which the object occurs.

In some examples, keypoint distribution may be used to estimate a scale for an object. Keypoints are generally areas of an image that can be used to generate feature descriptors. In general, keypoints detected at relatively higher scales correspond to relatively larger features of an object. Likewise, as image resolution decreases, finer details are more difficult to recognize. Therefore, details detected at higher scales for larger resolutions are typically detected, for smaller resolutions, at lower scales (and thus become finer details). Statistics can be collected indicative of distribution of keypoints across a scale space, which may be used to estimate the scaling factor of an image. Using keypoints extracted for a previous octave, a control unit may estimate a scale for an object of a query image, and use the estimated scale to select a minimum octave of a database of feature descriptors to search. That is, the control unit may cause the database to query only feature descriptors at octaves equal to and greater, but not less than, the minimum octave.

In some cases, a camera of a device may continually capture images, and a processor or other unit for object recognition may attempt to detect objects in all, or a subset, of the captured images. In some cases, the processor may arrive at an approximation of an object scale in one of the earlier images. The techniques of this disclosure may use previously determined object scale information for a previous picture to initialize an estimation of an object scale for a current image, e.g., after a user moves and causes an image tracker to lose a previously acquired target.

In general, for object recognition, a database of feature descriptor sets and other discriminating information is derived from training images. Feature descriptors are then extracted from a target image and used to query the database, to assess the contents of a given query image. For augmented reality or visual search applications, the client (for example, a cell phone) captures an image of an object of interest and compares it against the database of images, features, and meta-data information. This database can be stored on a server on the network, and can either be retrieved by the client for local processing or alternatively, the query can be transmitted to the server to be processed using network resources. The techniques of this disclosure are generally described with respect to scale invariant feature transform (SIFT) algorithm to perform the localization of keypoints and the extraction of feature descriptors. Each SIFT feature may have the following attributes: 2D (x, y) feature location, scale at which the feature is detected, the rotational orientation of the feature as given by that of the strongest image gradient in the feature neighborhood, and a vector that describes the local pixel variations in a discriminating way, essentially a histogram of local image gradients.

Keypoint identification and descriptor extraction can be computationally demanding. For instance, a typical half-size video graphics array (HVGA) image can produce thousands of SIFT features. The implementation of the SIFT algorithm, including the iterative matching process, can easily outstrip the computational resources available on some mobile platforms. However, in most practical cases, the number of actual feature descriptors that lead to matches with those in the database tend to be much lower than the number of feature descriptors actually calculated. That is, of the set of calculated feature descriptors, a small subset may yield an object identification result. This may be caused, in part, by different imaging conditions in the query image (e.g., illumination, perspective, etc.) affecting feature descriptors such that only a few end up matching with features in the database. The techniques of this disclosure may exploit the interrelationships between keypoints in the scale space to help reduce the computational load imposed by the descriptor extraction and matching process. Also, when recognizing/tracking multiple objects within a given scene, false positives can pose problems, especially if some objects are similar. In some examples, these techniques may include computation of a rough, relative depth-map of the scene to constrain the matching, so as to reduce false positives.

FIG. 1 is a block diagram illustrating an example system 2 in which techniques for incremental feature descriptor extraction may be applied. In this example, system 2 includes client device 10 and server device 50, which communicate via network 40. Client device 10, in this example, represents a mobile device, such as a laptop, a so-called netbook, a tablet computer, a personal digital assistant (PDA), a cellular or mobile phone or handset (including so-called "smartphones"), a global positioning system (GPS) device, a digital camera, a digital media player, a game device, or any other mobile device capable of communicating with server device 50. While described in this disclosure with respect to a mobile client device 10, the techniques of described in this disclosure should not be limited in this respect to mobile client devices. Instead, the techniques may be implemented by any device capable of storing a local object database and/or capable of communicating with server device 50 via network 40 or any other communication medium.

Server device 50 represents a server device that accepts connections, e.g., transmission control protocol (TCP) connections, and responds with its own TCP connection to form a TCP session by which to receive query data and provide identification data. Server device 50 may represent a visual search server device in that server device 50 performs or otherwise implements a visual search algorithm to identify one or more features or objects within an image.

Network 40 represents a public network, such as the Internet, that interconnects client device 10 and server device 50. Commonly, network 40 implements various layers of the open system interconnection (OSI) model to facilitate transfer of communications or data between client device 10 and server device 50. Network 40 typically includes any number of network devices, such as switches, hubs, routers, servers, to enable the transfer of the data between client device 10 and server device 50. While shown as a single network, network 40 may comprise one or more sub-networks that are interconnected to form network 40. These sub-networks may comprise service provider networks, access networks, backend networks or any other type of network commonly employed in a public network to provide for the transfer of data throughout network 40. While described in this example as a public network, network 40 may comprise a private network that is not accessible generally by the public.

As shown in the example of FIG. 1, client device 10 includes camera 12, sensors 14, control unit 20, local object database 30, and network interface 32. Control unit 20, in this example, includes feature extraction unit 22, scale estimation unit 24, and depth information unit 26. In some examples, control unit 20 may also include units similar to feature matching unit 62 and confidence valuation unit 64 of server device 50. For purposes of example, these units will be discussed with respect to server device 50, though it should be understood that similar units may be included within control unit 20 of client device 10.

Functionality attributed to control unit 20 and control unit 60 and sub-units thereof may be implemented by any combination of hardware, software, and/or firmware. When one or more functions attributed to control unit 20 are implemented in software or firmware, control unit 20 may include one or more computer-readable storage media for storing instructions for the software, as well as one or more hardware-based processing units for executing the software. Such processing units may comprise one or more general purpose processors. Control unit 20 and control unit 60 may additionally or alternatively include one or more hardware units, such as one or more digital signal processors (DSPs), general purpose microprocessors, application specific integrated circuits (ASICs), field programmable logic arrays (FPGAs), or other equivalent integrated or discrete logic circuitry. Any or all of the functionality attributed to control unit 20 and control unit 60 may be performed by any respective hardware, software, or firmware thereof. Thus, although separate units are illustrated within control units 20 and 60 in the example of FIG. 1, it should be understood that in practice, such separate units may be combined in any reasonable fashion.

Camera 12 may include a two-dimensional array of individual image sensor elements, e.g., arranged in rows and columns. Camera 12 may comprise, for example, an array of solid state sensor elements such as complementary metal-oxide semiconductor (CMOS) sensors, or other sensor elements. The image sensor elements within camera 12 are exposed to a scene to obtain light information from the scene and to capture a digital image of the scene. The digital image may include a two-dimensional matrix of pixel values, which may be defined in a particular color space, e.g., having red-green-blue values, or pixel luminance (intensity or brightness) values and pixel chrominance (color) values.

Sensors 14 include one or more environmental sensors that provide information to control unit 20. Control unit 20 may use this information to approximate a scale for an object in an image captured by camera 12. In some examples, sensors 14 may include a global positioning system (GPS) unit that interacts with GPS satellites to determine a geographic location of client device 10. The GPS unit may also provide an indication of a direction in which camera 12 was pointed when the image was captured. Control unit 20 may use this location and direction information to limit the search to potential objects that could be in the line of sight of camera 12.

For example, remote object database 52 may store geographic locations for objects of remote object database 52. When the GPS unit of sensors 14 determines a geographic location and direction of camera 12, control unit 20 may retrieve a subset of data from remote object database 52 having geographic locations in the line of sight of camera 12 and store the retrieved data as local object database 30. Feature extraction unit 22 may then extract feature descriptors from the image and query local object database 30 with these extracted feature descriptors.

As another example, feature extraction unit 22 may use the geographic location direction to approximate an initial scale of objects in the line of sight of camera 12. For example, remote object database 52 may store a most likely scale for objects in the geographic location near client device 10 and in the line of sight of camera 12, based on the location of client device 10 determined by the GPS unit of sensors 14. Feature extraction unit 22 may then initially extract feature descriptors using this initial scale and send a query to server device 50 via network 40, to query remote object database 52. The query may include the location information, in addition to the feature descriptors, in some examples.

Other examples of sensor may include, for example, temperature sensors, pressure sensors (e.g., barometric sensors), light sensors, infrared sensors, ultraviolet sensors, humidity sensors, carbon dioxide ($CO_2$) sensors, or other such environmental sensors, any or all of which may provide values for respective sensed values. Control unit 20 may include data ranges for any or all of these sensors indicative of indoor and outdoor environments. Control unit 20 may compare current values for any or all of the sensors to the corresponding data ranges to determine whether client device 10 was indoors or outdoors when camera 12 captured a query image.

Feature extraction unit 22 represents a unit that performs feature extraction in accordance with a feature extraction algorithm, such as a scale invariant feature transform (SIFT) algorithm, a compressed histogram of gradients (CHoG) algorithm, or other keypoint or feature description extraction algorithms. Generally, feature extraction unit 22 operates on image data, which may be captured locally using camera 12 or other image capture device included within client device 10. Alternatively, client device 10 may store image data without capturing this image data itself, e.g., by downloading the image data via network 40, locally via a wired connection with another computing device or via any other wired or wireless form of communication.

Scale estimation unit 24 represents a unit that estimates a scale for an object in a query image captured by, e.g., camera 12. For example, scale estimation unit 24 may estimate a scale for an object in a query image based on an expected distribution of keypoints from various scales (e.g., derived from a set of training images) compared to an actual keypoint distribution from the various scales for the image. Feature extraction unit 22 may extract keypoints for a previous octave for the image and provide these keypoints to scale estimation unit 24, and scale estimation unit 24 may use these keypoints to approximate a scale for an object in the query image, using the configuration data. Using the estimated scale, scale estimation unit 24 may calculate a minimum octave of a database (e.g., either or both of local object database 30 and/or remote object database 52) to search.

Scale estimation unit 24 may store configuration data describing keypoint distribution for various scales. Scale estimation unit 24 may then compare distributions of keypoints for the query image to the distributions of the configuration data. Scale estimation unit 24 may then determine an approximate scale for the object in the query image as the scale having the best-matching keypoint distribution. That is, scale estimation unit 24 may determine values representative of keypoint distribution for the query image at various scales, and compare these values to the expected values for keypoint distribution of various scales of the configuration data. Scale estimation unit 24 may approximate the scale of an object as the scale for which keypoint distribution values from the query image most closely match the estimated keypoint distribution values from the configuration data for the corresponding scale.

In accordance with the techniques of this disclosure, feature extraction unit 22 may start at an octave corresponding to the estimated scale for the query image. That is, feature extraction unit 22 may extract feature descriptors for the octave corresponding to the estimated scale, using keypoints extracted from that octave. Then, control unit 20 may determine whether an identity of an object in the query image can be determined using only these feature descriptors, and if not, proceed to extract feature descriptors for a subsequent octave.

Depth estimation unit 26 is generally configured to estimate depth for one or more objects in an image captured by camera 12. Depth estimation unit 26 may comprise a depth sensor, such as a time-of-flight sensor, structured light sensor, or Kinects. In some examples, client device 10 may include a camera array having two or more cameras, e.g., for capturing three-dimensional image and/or video data. In such examples, depth estimation unit 26 may be configured to calculate depth information for objects in an image captured by the camera array. For example, depth estimation unit 26 may receive two or more images of a scene that were captured by the camera array. By comparing horizontal locations of similar pixels of the images, depth estimation unit 26 may calculate horizontal disparity (or parallax) of similar pixels between the images, and based on this disparity, determine a depth of an object corresponding to the pixels. Depth estimation unit 26 may send one or more depth values (e.g., a depth map) to feature extraction unit 22, which may use the depth values when determining a starting octave from which to extract feature descriptors.

In some examples, a device need not include a depth estimation unit, and certain techniques of this disclosure may still be operable. However, when the device includes a depth estimation unit, such as depth estimation unit 26, the device may be configured to use depth information to select the octave in which features are computed and the order in which octaves are processed. For example, if camera 12 faces a relatively large object directly (that is, head-on), pixels corresponding to the object may generally occur at the same distance from client device 10. Such information may be used to determine the scale at which the most valuable keypoints are to be found, in some examples. In addition, or in the alternative, the depth information can be used along with the confidence values to determine the scales where the most valuable keypoints are found. Similarly, in some examples, if the object is placed at an angle relative to the camera, then the depth differences between the closest point to the farthest point in the object could be used to identify the range of scales where the most valuable keypoints are found. In this manner, the depth information may be used, at least in part, to estimate a scale value for an object in an image.

As explained below, network interface 32 may comprise a wireless network interface. When network interface 32 includes a wireless network interface, the wireless network interface may implement one or more wireless network protocols, such as one or more of the IEEE 802.11 standards (e.g., 802.11a/b/g/n), the Third Generation Mobile Telecommunications (3G) standards, the Fourth Generation telecommunications standards (which may include mobile Worldwide Interoperability for Microwave Access (mobile WiMAX), 3G Long Term Evolution (LTE), LTE Advanced, and WirelessMAN-Advanced (IEEE 802.16)), or other wireless network protocols. In general, if a wireless network is available, control unit 20 may determine that it is highly likely that client device 10 is indoors. When client device 10 is indoors, control unit 20 may determine that sizes of objects in an image captured by camera 12 are likely to be relatively small. Accordingly, feature extraction unit 22 may be configured to treat whether a wireless network is available as a factor in determining a starting octave from which to extract feature descriptors for a query image.

In the example of FIG. 1, server device 50 stores remote object database 52, while client device 10 stores local object database 30. Client device 10 may retrieve data for local object database 30 from server device 50 via network 40.

Accordingly, local object database 30 may represent all or a portion of remote object database 52. In some examples, local object database 30 may include data from remote object database 52 as well as data from other remote object databases of other server devices (not shown in FIG. 1). In general, the techniques of this disclosure may query either or both of local object database 30 and/or remote object database 52 to determine an identity of an object in an image.

As described in greater detail below, feature extraction unit 22 may generally extract keypoints from various sets of filtered images based on the original image. In some examples, the original image may be filtered using Gaussian filters to produce a set of Gaussian-blurred images. While it should be understood that various filtering techniques may be applied, this disclosure will primarily focus on Gaussian filters as an example. However, other similar filtering techniques may also be applied without departing from the techniques of this disclosure. In general, each of the filtered images in one set may have a similar size (e.g., in terms of pixel resolution), where each image in the set may be progressively more filtered. Each of the sets may be referred to as an "octave." Gaussian blurring generally involves convolving the image data for a particular octave with a Gaussian blur function at a defined scale. Feature extraction unit 22 may incrementally convolve the image data, where a fixed multiplicative factor, referred to by the variable sigma ($\sigma$), increments consequent Gaussian filters within the octave. Feature extraction unit 22 may form what may be referred to as a "Gaussian pyramid" having each of the Gaussian-blurred images for a particular octave. Feature extraction unit 22 may then compare two successively stacked Gaussian-blurred images in the pyramid to generate difference of Gaussian (DoG) images. The DoG images may form what is referred to as a "DoG space."

Based on this DoG space, feature extraction unit 22 may detect keypoints, where a keypoint refers to a region or patch of pixels around a particular sample point or pixel in the image data that is potentially interesting from a geometrical perspective. Generally, feature extraction unit 22 identifies keypoints as local maxima and/or local minima in the constructed DoG space. Feature extraction unit 22 may then assign these keypoints one or more orientations, or directions, based on directions of a local image gradient for the patch in which the keypoint was detected. To characterize these orientations, feature extraction unit 22 may define the orientation in terms of a gradient orientation histogram. Feature extraction unit 22 may then define a feature descriptor as a location and an orientation (e.g., by way of the gradient orientation histogram). After defining the feature descriptor, feature extraction unit 22 may output the feature descriptor, e.g., by querying local object database 30 or remote object database 52 with the feature descriptor. Feature extraction unit 22 may output a set of feature descriptors using this process.

Network interface 32 represents any type of interface that is capable of communicating with server device 50 via network 40, including wireless interfaces and wired interfaces. Network interface 32 may represent a wireless cellular interface and include the necessary hardware or other components, such as antennas, modulators and the like, to communicate via a wireless cellular network with network 40 and via network 40 with server device 50. In this instance, although not shown in the example of FIG. 1, network 40 includes the wireless cellular access network by which wireless cellular network interface 32 communicates with network 40. Although not illustrated in FIG. 1, client device 10 may further include a display, e.g., any type of display unit capable of displaying images, such as the image data in which object identities are determined, or any other types of data. The a display may, for example, comprise a light emitting diode (LED) display device, an organic LED (OLED) display device, a liquid crystal display (LCD) device, a plasma display device, or any other type of display device.

Server device 50 includes network interface 54, remote object database 52, and control unit 60. Control unit 60, in this example, includes feature matching unit 62 and confidence valuation unit 64. Network interface 54 may be similar to network interface 32 of client device 10, in that network interface 54 may represent any type of interface capable of communicating with a network, such a network 40. Feature matching unit 62 represents a unit that performs feature matching to identify one or more features or objects in the image data based on feature descriptors received from client device 10.

Feature matching unit 62 may access remote object database 52 to perform this feature identification, where remote object database 52 stores data defining feature descriptors and associates at least some of the received feature descriptors with identification data identifying the corresponding feature or object extracted from the image data. Confidence valuation unit 64 determines a confidence value, representative of a confidence that the object identified as corresponding to the received feature identifiers is the actual identity of the object in the image data.

Objects stored in remote object database 52 may include a plurality of feature descriptors, and the feature descriptors received from client device 10 may match only a subset of the feature descriptors of an object in remote object database 52. In general, the confidence value represents a correspondence between matches between the received feature descriptors and the feature descriptors associated with a corresponding object. Thus, a higher confidence value may reflect that the received feature descriptors match a relatively large number of feature descriptors of the object stored by remote object database 52, while a lower confidence value may reflect that the received feature descriptors match a relatively small number of feature descriptors of the object stored by remote object database 52.

After determining an identity of an object for feature descriptors received from client device 10, feature matching unit 62 provides identification data representative of the determined identity. Likewise, confidence valuation unit 64 assesses the confidence that the determined identity properly matches the received feature descriptors, generates a corresponding confidence value, and provides the confidence value to client device 10. Client device 10 may determine whether the confidence value exceeds a threshold, and if not, extract additional feature descriptors from further octaves for the image data and send these additional feature descriptors to server device 50 for further analysis.

Initially, a user of client device 10 may interface with client device 10 to initiate a visual search. The user may interface with a user interface or other type of interface presented by a display of client device 10 to select the image data and then initiate the visual search to identify one or more features or objects that are the focus of the image stored as the image data. For example, the image data may correspond to an image of a piece of famous artwork. The user may have captured this image using camera 12 of client device 10, downloaded this image from network 40, or locally retrieved the image via a wired or wireless connection with another computing device. In any event, after selecting the image data, the user may initiate the visual search, in this example, to identify the piece of famous artwork by, for example, name, artist and date of completion.

In response to initiating the visual search, client device 10 invokes feature extraction unit 22 to extract at least one the feature descriptor describing one of the so-called "keypoints" found through analysis of the image data. Control unit 20 may query local object database 30 using the feature descriptor and/or send the feature descriptor to server device 50 via network 40 to query remote object database 52 using the feature descriptor. In some examples, feature extraction unit 22 forwards the feature descriptor to a feature compression unit (not shown in this example), which may compress the feature descriptor prior to transmission of the feature descriptor via network 40. When sent to server device 50, control unit 20 may encapsulate the feature descriptor (which may be compressed prior to encapsulation) as a network packet, e.g., a TCP/IP packet.

While various components, modules, or units are described in this disclosure to emphasize functional aspects of devices configured to perform the disclosed techniques, these units do not necessarily require realization by different hardware units. Rather, various units may be combined in a hardware unit or provided by a collection of inter-operative hardware units, including one or more processors as described above, in conjunction with suitable software and/or firmware stored to computer-readable mediums. In this respect, reference to units in this disclosure is intended to suggest different functional units that may or may not be implemented as separate hardware units and/or hardware and software units.

As discussed above, feature extraction unit 22, in accordance with the techniques of this disclosure, may be configured to sequentially extract feature descriptors from an image captured by camera 12. That is, feature extraction unit 22 may extract feature descriptors from a first octave, determine whether those feature descriptors can be used to accurately determine the identity of an object in the image, and if not, extract feature descriptors from one or more subsequent octaves. Moreover, elements of client device 10, such as sensors 14, network interface 32, data stored in local object database 30, scale estimation unit 24, and/or depth estimation unit 26, may provide data to feature extraction unit 22 may use to select a first and/or subsequent octave. In general, upper octaves may be relatively smoother and relatively more stable than lower octaves. Thus, in some examples, feature extraction unit 22 may try a last octave, if the first octave did not yield a result, followed by higher octaves if the last octave does not yield a result. In some examples, if there are no matches when trying octave zero (0), the reference image in the database may exist at a higher scale, and thus, feature extraction unit 22 may move to a higher octave for feature extraction.

Feature attributes from training images or test images may be used to reduce complexity in feature generation and matching. These statistics may be used to initialize parameters involved in the feature extraction process. Once initialized, feature extraction unit 22 may incrementally extract features, perform recognition and/or inference, and if the recognition is not sufficient for reliable decisions as to the identity of the object in the image, update the feature extraction parameters for a next set of feature extractions. Using training data (which may be stored in local object database 30 and/or retrieved from remote object database 52) and past query statistics, recognition of objects in a query image may be achieved in fewer steps, which may result in a computational savings.

Figure 5:
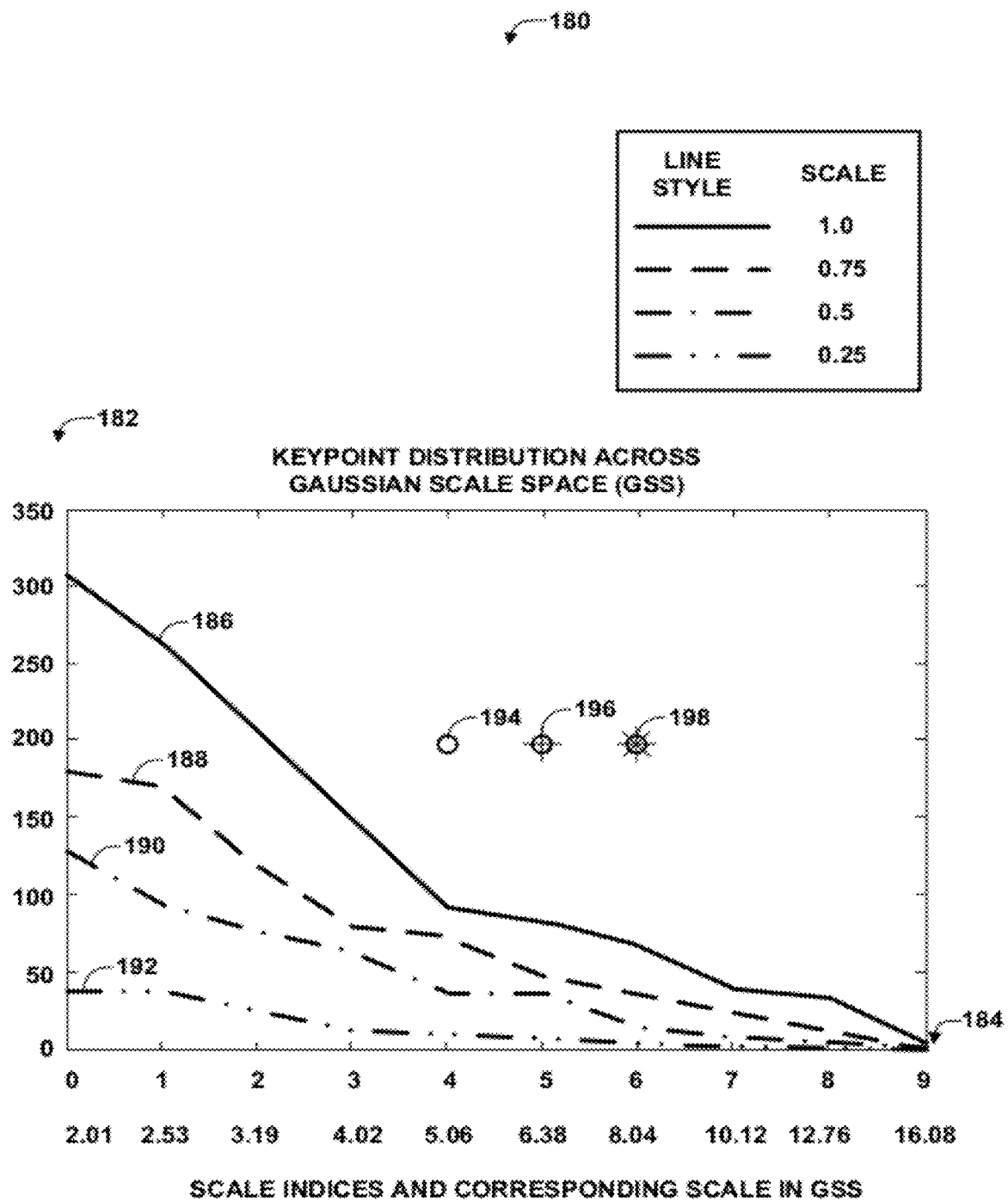
FIG. 5 is a line drawing of a chart illustrating an example keypoint distribution across various Gaussian scale spaces.

Scale estimation unit 24 may attempt to identify a scale of an object based on feature attributes. The scale of an object may be used to select a minimum octave of the database to query. That is, when submitting feature descriptors to the database, the database may search octaves equal to or greater, but not less than, the minimum octave, when a minimum octave is specified. Thus, after each set of keypoints are extracted, scale estimation unit 24 may use the distribution of the keypoints to approximate a scale for an object in the image, and use the scale to estimate the minimum octave. FIG. 5 below illustrates an example relationship between keypoint distribution and corresponding minimum octaves. More details regarding the use of keypoint distribution to estimate the minimum octave of the database are discussed below with respect to FIG. 5. In any case, using incremental extraction of feature descriptors, as well as a minimum octave, may provide a relatively faster search both by extracting fewer feature descriptors initially, as well as reducing the amount of the database that is actually searched.

Depth estimation unit 26 may determine depth values for a query image. For example, depth estimation unit 26 may generate a depth map for the query image, where the depth map includes depth values for pixels or objects in the query image. Using the depth map, feature extraction unit 22 may constrain matching or tracking, which may result in less false positives. Moreover, feature extraction unit 22 may limit matching or tracking to a particular depth level, which may result in lower complexity.

In this manner, the techniques of this disclosure may take advantage of certain observations on feature descriptor extraction. These observations include, first, that the scale of an object in a query image may generally determine how its keypoints are distributed in the scale space. Smaller objects tend to have a distribution that is squished towards lower scales in the scale space. Also, if certain regions in the image are more textured than others, resulting keypoints tend to vary in their stability. Likewise, the qualities for feature descriptors anchored at the keypoints also vary in their stability. Furthermore, the image quality generally improves with better imaging conditions (e.g., good illumination), which may result in more keypoints from the image. However, when the resolution is relatively high, the number of actual feature descriptors tends to be lower, due to larger variations, that is, greater detail, relative to training images for which data is stored in, e.g., local object database 30 and/or remote object database 52. These differences may result from different illumination, perspective, or other photography parameters.

Local object database 30 and/or remote object database 52, as discussed above, generally store various data for a set of training images. This data may include feature descriptors for various objects, as well as data that assist in scale estimation, depth mapping, and/or other techniques for reducing the complexity of object identification in images. For example, the databases may store data indicative of what octaves and scales from which to extract feature descriptors in a given location cell (or "loxel") of an image. An image may be divided into a two-dimensional matrix of regions, referred to as loxels. The database data may include side information about the ordering of the octaves and scales, and/or the octaves and scales to which matching features typically belong. The databases may also store usage statistics that describe the most likely scales or octaves that match well within a given loxel.

In some examples, the databases may store keypoint distribution based image scale estimation. The databases may also store, in some examples, data corresponding to sensor-based location information, which may be used to initialize scale and octave parameters to feed in feature extraction. For example, control unit 20 may determine that a query image is of an outdoor environment using GPS information from sensors 14, and the databases may store information about the locations of objects with respect to the geographic location of client device 10 when the query image is captured. Control unit 20 may determine that a query image is of an indoor environment based on indoor positioning techniques, such as determining whether a wireless network is available. A stereo camera may be used to estimate the depth of an object in a query image, which may help in initializing octave selection. Camera intrinsic parameters (e.g., focal length , , , principal point, image format) may be used to estimate depth for an object. In some instances, intrinsic parameters need not be configured a priori for a sparse depth map. In some examples, control unit 20 may calculate intrinsic and extrinsic parameters from feature correspondences, e.g., using the Eight-Point Algorithm. In general, the Eight-Point Algorithm includes using eight corresponding points in a stereo image pair to compute the essential matrix or fundamental matrix for the stereo image pair.

In some examples, control unit 20 may be configured to use historical data to determine an initial scale or octave in which to perform feature extraction. For example, a tracker (not shown) executed by control unit 20 may determine depth or scale for objects in images captured by camera 12. If the tracker loses a target, control unit 20 may use the most recent "good" information about tracked targets' scale when determining scale for objects in a more recent image.

Using any or all of the data described above, control unit 20 may be configured to determine an identity of an object in a query image. For example, feature extraction unit 22 may initially select a preferred octave and set of scales and extract feature descriptors for the preferred octave and set of scales. Feature extraction unit 22 may progressively add next octaves in the scale-space as needed, which may allow early termination of the object recognition process, without the risk of terminating the process prematurely. The preference for octaves and set of scales can be derived from data of local object database 30 and/or remote object database 52 and/or query statistics from the tracker. Scale estimation unit 24 may estimate the scale of the object using cumulative threshold statistics after each iteration of keypoint extraction, which may also be refined using data of the databases. Moreover, the estimated scale may be refined based on additional inputs, such as data from sensors 14, depth information determined by depth estimation unit 26, or other data.

The techniques of this disclosure may provide one or more advantages. For example, these techniques may provide faster, localized extraction of feature descriptors, e.g., for SIFT, than SIFT would otherwise achieve. These techniques may allow for estimation of a most relevant subset of scale-space levels (e.g., octave levels) for processing, which may improve speed and complexity of object recognition. These techniques may further allow faster searching in local object database 30 of client device 10 (e.g., a mobile phone). That is, these techniques allow feature descriptor extraction from upper levels first, and stopping the algorithm when sufficient accuracy is reached. In this manner, there may be a relatively short response in a distributed visual search system, such as system 2 of FIG. 1. Feature descriptors may be transmitted via network 40 to server device 50 progressively, starting with upper levels first, and server device 50 may perform several iterations of searches on received data and send results or a termination signal back once sufficient accuracy match is found. Client device 10 may stop sending feature descriptors to server device 50 after results of the search or the termination signal is received.

The techniques of this disclosure may also reduce complexity and improve speed of tracking. Once an object in an image is recognized, its relative scale may become known as well. If the tracker loses the object, the next search operation may be simplified using the scale of the object that was previously being tracked. These techniques may further initialize a kernel size for clustering of keypoints using an estimated scale, and then perform segmentation based on a relative depth map estimate.

In this manner, client device 10 represents an example of a device including a processor configured to extract a first set of one or more keypoints from a first set of blurred images of a first octave of a received image, calculate a first set of one or more descriptors for the first set of keypoints, receive a confidence value for a result produced by querying a feature descriptor database with the first set of descriptors, wherein the result comprises information describing an identity of an object in the received image, and extract a second set of one or more keypoints from a second set of blurred images of a second octave of the received image when the confidence value does not exceed a confidence threshold.

Figure 2:
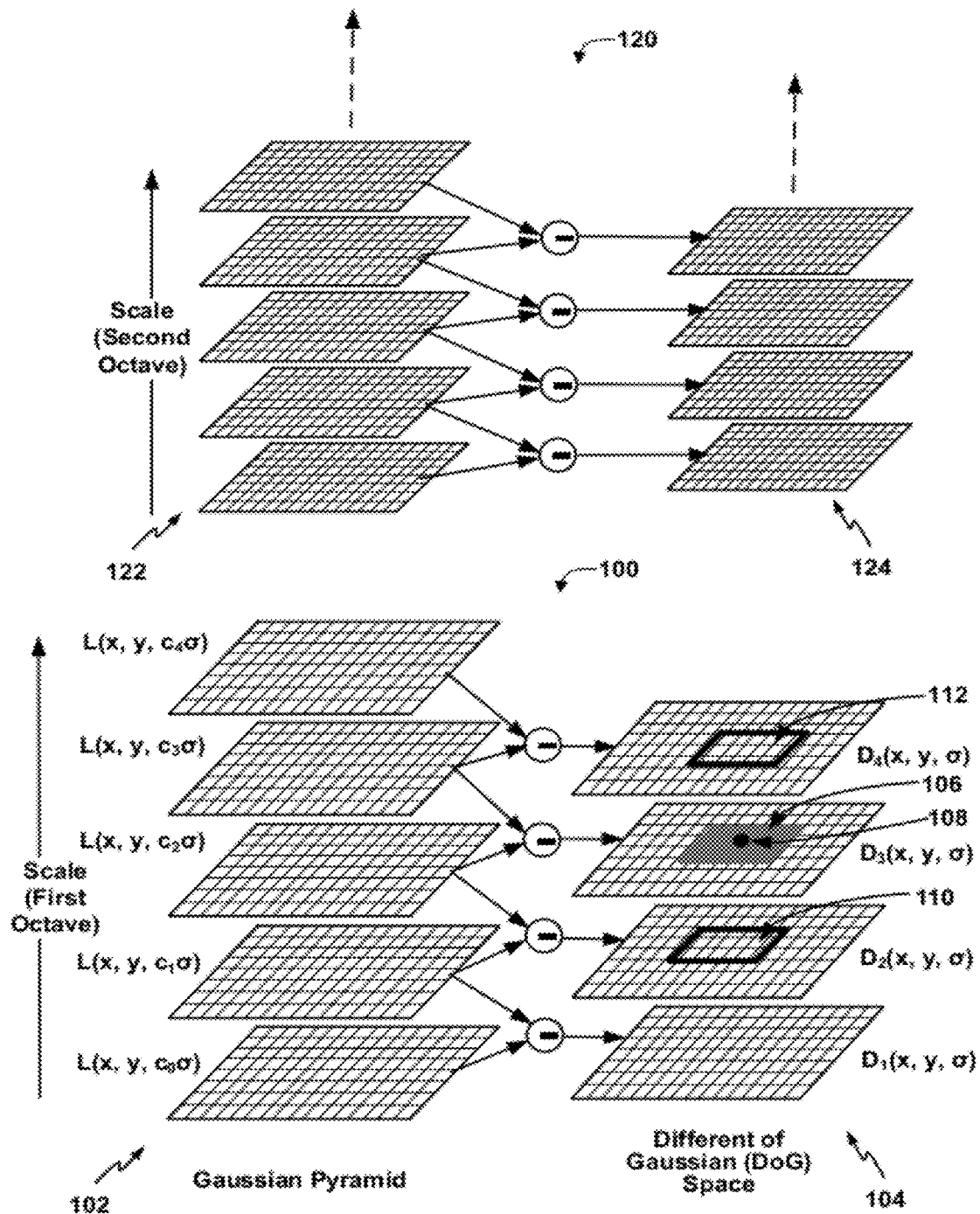
FIG. 2 is a conceptual diagram illustrating a difference of Gaussian (DoG) pyramid that has been determined for use in keypoint extraction.

FIG. 2 is a conceptual diagram illustrating a difference of Gaussian (DoG) pyramid 104 that has been determined for use in keypoint extraction. The example of FIG. 2 illustrates a set 100 of images in Gaussian pyramid 102 and corresponding DoG pyramid 104, where set 100 corresponds to a first selected octave, and a second set 120 of images in Gaussian pyramid 122 and corresponding DoG pyramid 124, where set 120 corresponds to a second octave. In accordance with the techniques of this disclosure, control unit 20 may be configured to generate data for set 120 when an object identified using data for set 100 yields a confidence value below a threshold value.

Feature extraction unit 22 of FIG. 1 may construct DoG pyramid 104 by computing the difference of any two consecutive Gaussian-blurred images in Gaussian pyramid 102. The input image I(x, y), which may be received by feature extraction unit 22 from camera 12 in the example of FIG. 1, is gradually Gaussian blurred to construct Gaussian pyramid 102. Gaussian blurring generally involves a process of convolving the original image I(x, y) with the Gaussian blur function G(x, y, c) at scale c such that the Gaussian blurred function L(x, y, c) is defined as L(x, y, c)=G(x, y, c)*I(x, y). Here, G is a Gaussian kernel, c denotes the standard deviation of the Gaussian function that is used for blurring the image I(x, y). As c, is varied ($c_0 < c_1 < c_2 < c_3 < c_4$), the standard deviation c varies and a gradual blurring is obtained. Sigma is the base scale variable (essentially the width of the Gaussian kernel). When the initial image I(x, y) is incrementally convolved with Gaussians G to produce the blurred images L, the blurred images L are separated by the constant factor c in the scale space. In the example of SIFT, Gaussian kernels may be used to generate the scale-space. In some examples, alternate, low-pass kernels may be used to generate a scale space, e.g., a box function, a triangular function, or other such functions.

In DoG space or pyramid 104, $D(x, y, a) = L(x, y, c_n) - L(x, y, c_{n-1})$. A DoG image D(x, y,) is the difference between two adjacent Gaussian blurred images L at scales $c_n$ and $c_{n-1}$. The scale of the D(x, y,) lies somewhere between $c_n$ and $c_{n-1}$. As the number of Gaussian-blurred images L increase and the approximation provided for Gaussian pyramid 102 approaches a continuous space, the two scales also approach into one scale. The convolved images L may be grouped by octave, where an octave corresponds to a doubling of the value of the standard deviation. Moreover, the values of the multipliers k (e.g., $c_0 < c_1 < c_2 < c_3 < c_4$), are selected such that a fixed number of convolved images L are obtained per octave. Then, the DoG images D may be obtained from adjacent Gaussian-blurred images L per octave.

In accordance with the techniques of this disclosure, after images D are obtained for a given octave, feature extraction unit 22 may extract keypoints for the octave and determine feature descriptors for these extracted keypoints. The feature descriptors for the current octave (and any previous octaves) may be used to attempt to determine the identity of an object in the image. After an identity of the object is determined, control unit 20 may obtain a confidence value for the determined identity. If the confidence value is less than a threshold value, feature extraction unit 22 may proceed to a subsequent octave, determining additional feature descriptors for the subsequent octave and again attempting to determine the identity of the object in the image. On the other hand, when the confidence value exceeds the threshold, feature extraction unit 22 need not proceed to a subsequent octave. As described in greater detail below, control unit 20 may select the first octave and subsequent octaves based on various factors, such as, for example, an approximated scale for objects in the image, sensor data indicating whether the query image was captured in an indoor or outdoor environment, and/or a depth map for the query image indicative of depth values for an object in the query image.

Feature extraction unit 22 may then use DoG pyramid 104 to identify keypoints for the image I(x, y). In performing keypoint extraction, feature extraction unit 22 determines whether the local region or patch around a particular sample point or pixel in the image is a potentially interesting patch (geometrically speaking). Generally, feature extraction unit 22 identifies local maxima and/or local minima in the DoG space 104 and uses the locations of these maxima and minima as keypoint locations in DoG space 104. In the example illustrated in FIG. 2, feature extraction unit 22 identifies a keypoint 108 within a patch 106. Finding the local maxima and minima (also known as local extreme detection) may be achieved by comparing each pixel (e.g., the pixel for keypoint 108) in DoG space 104 to its eight neighboring pixels at the same scale and to the nine neighboring pixels (in adjacent patches 110 and 112) in each of the neighboring scales on the two sides, for a total of 26 pixels (9×2+8=26). If the pixel value for the keypoint 106 is a maximum or a minimum among all 26 compared pixels in the patches 106, 110, and 108, then feature extraction unit 22 selects this as a keypoint. Feature extraction unit 22 may further process the keypoints such that their location is identified more accurately. Feature extraction unit 22 may, in some instances, discard some of the keypoints, such as the low contrast key points and edge keypoints.

Figure 3:
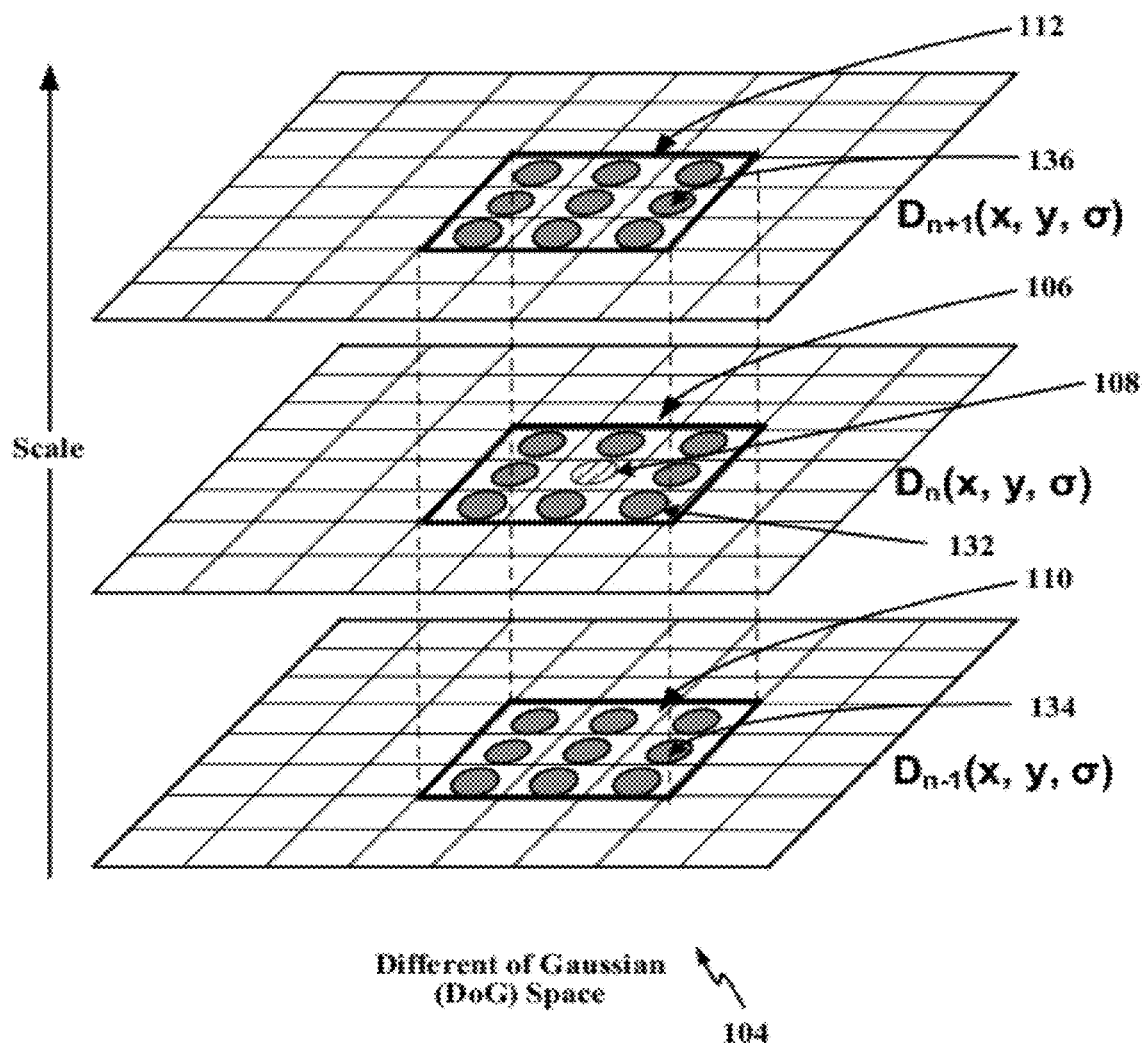
FIG. 3 is a conceptual diagram illustrating detection of a keypoint in more detail.

FIG. 3 is a conceptual diagram illustrating detection of a keypoint in more detail. In the example of FIG. 3, each of the patches 106, 110, and 112 include a 3×3 pixel region. Feature extraction unit 22 first compares a pixel of interest (e.g., keypoint 108) to its eight neighboring pixels 132 at the same scale (e.g., patch 106) and to the nine neighboring pixels 134 and 136 in adjacent patches 110 and 112 in each of the neighboring scales on the two sides of the keypoint 108.

Feature extraction unit 22 may assign each keypoint one or more orientations, or directions, based on the directions of the local image gradient. By assigning a consistent orientation to each keypoint based on local image properties, feature extraction unit 22 may represent the keypoint descriptor relative to this orientation and therefore achieve invariance to image rotation. Feature extraction unit 22 then calculates magnitude and direction for every pixel in the neighboring region around the keypoint 108 in the Gaussian-blurred image L and/or at the keypoint scale. The magnitude of the gradient for the keypoint 108 located at (x, y) may be represented as m(x, y) and the orientation or direction of the gradient for the keypoint at (x, y) may be represented as $\Gamma(x, y)$.

Feature extraction unit 22 then uses the scale of the keypoint to select the Gaussian smoothed image, L, with the closest scale to the scale of the keypoint 108, so that all computations are performed in a scale-invariant manner. For each image sample, L(x, y), at this scale, feature extraction unit 22 computes the gradient magnitude, m(x, y), and orientation, $\Gamma(x, y)$, using pixel differences. For example the magnitude m(x,y) may be computed in accordance with the following equation (1):

$$m(x, y) = \sqrt{(L(x+1, y) - L(x-1, y))^2 + (L(x, y+1) - L(x, y-1))^2} . \quad (1)$$

Feature extraction unit 22 may calculate the direction or orientation $\Gamma(x, y)$ in accordance with the following equation (2):

$$\Gamma(x, y) = \arctan\left[\frac{L(x, y+1) - L(x, y-1)}{L(x+1, y) - L(x-1, y)}\right] \quad (2)$$

In equation (2), L(x, y) represents a sample of the Gaussian-blurred image L(x, y), at scale which is also the scale of the keypoint.

Feature extraction unit 22 may consistently calculate the gradients for the keypoint either for the plane in the Gaussian pyramid that lies above, at a higher scale, than the plane of the keypoint in the DoG space or in a plane of the Gaussian pyramid that lies below, at a lower scale, than the keypoint. Either way, for each keypoint, feature extraction unit 22 calculates the gradients at the same scale in a rectangular area (e.g., patch) surrounding the keypoint. Moreover, the frequency of an image signal is reflected in the scale of the Gaussian-blurred image. Yet, SIFT and other algorithm, such as a compressed histogram of gradients (CHoG) algorithm, simply use gradient values at all pixels in the patch (e.g., rectangular area). A patch is defined around the keypoint; sub-blocks are defined within the block; samples are defined within the sub-blocks and this structure remains the same for all keypoints even when the scales of the keypoints are different. Therefore, while the frequency of an image signal changes with successive application of Gaussian smoothing filters in the same octave, the keypoints identified at different scales may be sampled with the same number of samples irrespective of the change in the frequency of the image signal, which is represented by the scale.

To characterize a keypoint orientation, feature extraction unit 22 may generate a gradient orientation histogram (see FIG. 4) by using, for example, Compressed Histogram of Gradients (CHoG). The contribution of each neighboring pixel may be weighted by the gradient magnitude and a Gaussian window. Peaks in the histogram correspond to dominant orientations. Feature extraction unit 22 may measure all the properties of the keypoint relative to the keypoint orientation, and this may provide invariance to rotation.

In one example, feature extraction unit 22 computes the distribution of the Gaussian-weighted gradients for each block, where each block is 2 sub-blocks by 2 sub-blocks for a total of 4 sub-blocks. To compute the distribution of the Gaussian-weighted gradients, feature extraction unit 22 forms an orientation histogram with several bins with each bin covering a part of the area around the keypoint. For example, the orientation histogram may have 36 bins, each bin covering 10 degrees of the 360 degree range of orientations. Alternatively, the histogram may have 8 bins, each covering 45 degrees of the 360 degree range. It should be clear that the histogram coding techniques described herein may be applicable to histograms of any number of bins.

Figure 4:
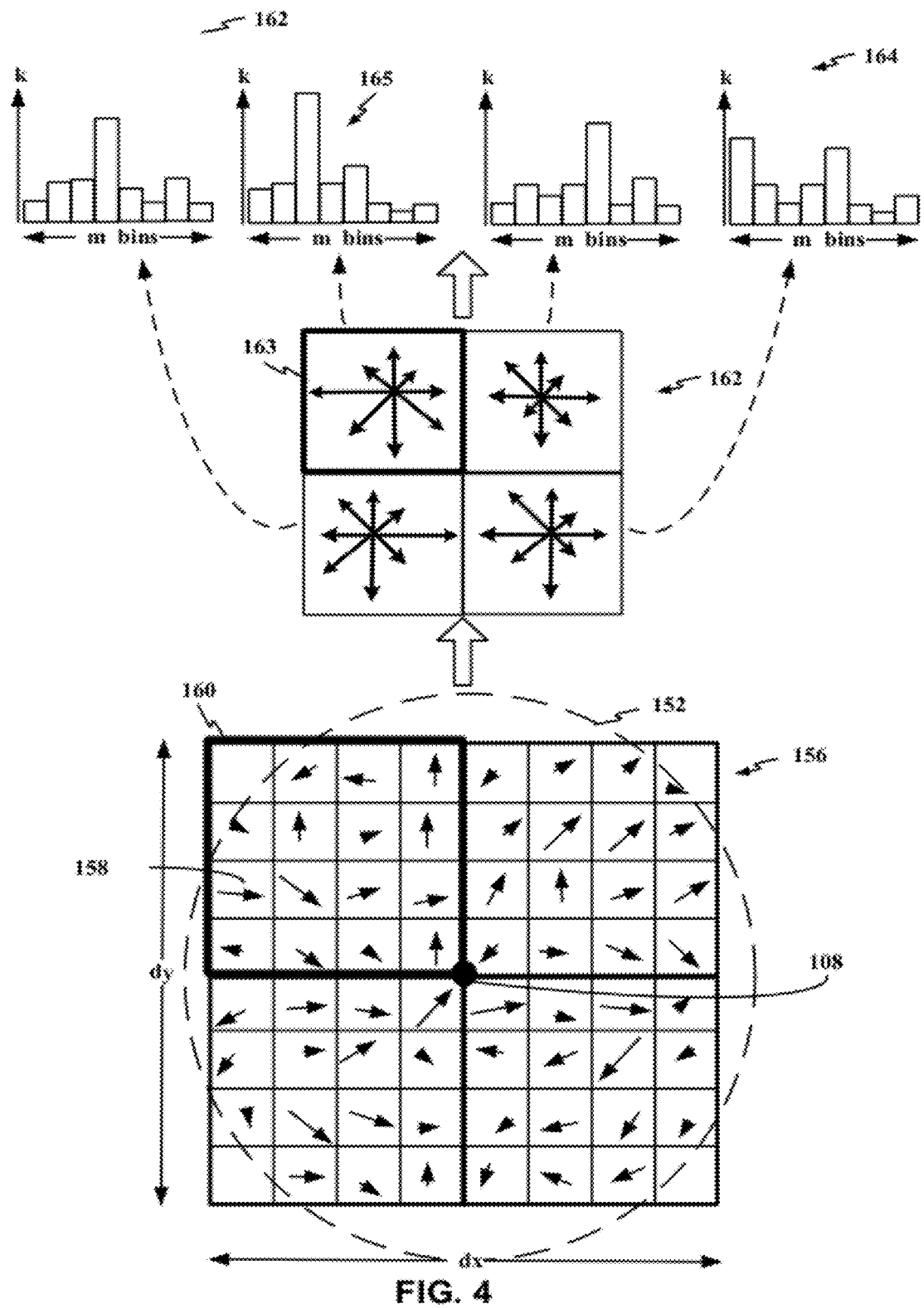
FIG. 4 is a conceptual diagram illustrating example techniques by which a feature extraction unit may obtain gradient distributions and orientation histograms.

FIG. 4 is a conceptual diagram illustrating example techniques by which feature extraction unit 22 may obtain gradient distributions and orientation histograms. Here, a two-dimensional gradient distribution (dx, dy) (e.g., block 156) is converted to a one-dimensional distribution (e.g., histogram 164). The keypoint 108 is located at a center of the patch 156 (also called a cell or region) that surrounds the keypoint 108. The gradients that are pre-computed for each level of the pyramid are shown as small arrows at each sample location 158. As shown, 4×4 groups of samples 158 form a sub-block 160, and 2×2 groups of sub-blocks form the block 156. Block 156 may also be referred to as a descriptor window.

The Gaussian weighting function is shown with the circle 152 and may be used to assign a weight to the magnitude of each of sample points 158. The weight in the circular window 152 falls off smoothly. The purpose of the Gaussian window 152 is to avoid sudden changes in the descriptor with small changes in position of the window and to give less emphasis to gradients that are far from the center of the descriptor. A 2×2=4 array of orientation histograms 162 is obtained from the 2×2 sub-blocks with 8 orientations in each bin of the histogram resulting in a (2×2)×8=32 dimensional feature descriptor vector. For example, orientation histograms 163 and 165 may correspond to the gradient distribution for sub-block 160. However, using a 4×4 array of histograms with 8 orientations in each histogram (8-bin histograms), resulting in a (4×4)×8=128 dimensional feature descriptor vector for each keypoint may yield a better result. Note that other types of quantization bin constellations (e.g., with different Voronoi cell structures) may also be used to obtain gradient distributions.

As used herein, a histogram is a mapping $k_i$ that counts the number of observations, sample, or occurrences (e.g., gradients) that fall into various disjoint categories known as bins. The graph of a histogram is merely one way to represent a histogram. Thus, if k is the total number of observations, samples, or occurrences and m is the total number of bins, the frequencies in histogram $k_i$ satisfy the following condition:

$$n = \sum_{i=1}^{m} k_i, \quad (3)$$

where Σ is the summation operator.

Each sample added to the histograms 162 may be weighted by its gradient magnitude within a Gaussian-weighted circular window 152 with a standard deviation that is 1.5 times the scale of the keypoint. Peaks in the resulting orientation histogram 164 correspond to dominant directions of local gradients. The highest peak in the histogram is detected and then any other local peak that is within a certain percentage, such as 80%, of the highest peak is used to also create a keypoint with that orientation. Therefore, for locations with multiple peaks of similar magnitude, there can be multiple keypoints created at the same location and scale but different orientations.

The histograms from the sub-blocks may be concatenated to obtain a feature descriptor vector for the keypoint. If the gradients in 8-bin histograms from 16 sub-blocks are used, a 128 dimensional feature descriptor vector may result.

In this manner, a descriptor may be obtained for each keypoint, where such descriptor may be characterized by a location (x, y), an orientation, and a descriptor of the distributions of the Gaussian-weighted gradients. Note that an image may be characterized by one or more keypoint descriptors (also referred to as image descriptors).

In some exemplary applications, an image may be obtained and/or captured by a mobile device and object recognition may be performed on the captured image or part of the captured image. According to a first option, the captured image may be sent by the mobile device to a server where it may be processed (e.g., to obtain one or more descriptors) and/or compared to a plurality of images (e.g., one or more descriptors for the plurality of images) to obtain a match (e.g., identification of the captured image or object therein). However, in this option, the whole captured image is sent, which may be undesirable due to its size. In a second option, the mobile device processes the image (e.g., perform feature extraction on the image) to obtain one or more image descriptors and sends the descriptors to a server for image and/or object identification. Because the keypoint descriptors for the image are sent, rather than the image, this may take less transmission time so long as the keypoint descriptors for the image are smaller than the image itself. Thus, compressing the size of the keypoint descriptors may be highly desirable.

In order to minimize the size of a keypoint descriptor, it may be beneficial to compress the descriptor of the distribution of gradients. Since the descriptor of the distribution of gradients is represented by histogram, efficient coding techniques for histograms are described herein.

In order to efficiently represent and/or compress feature descriptors, the descriptor of the distributions (e.g., orientation histograms) may be more efficiently represented. Thus, one or more methods or techniques for efficiently coding of histograms are described herein. Note that these methods or techniques may be implemented with any type of histogram implementation to efficiently (or even optimally) code a histogram in a compressed form. Efficiently coding of a histogram is a distinct problem not addressed by traditional encoding techniques. Traditional encoding techniques have focused on efficiently encoding a sequence of values. Because sequence information is not used in a histogram, efficiently encoding a histogram is a different problem than those addressed by conventional techniques.

As a first step, consideration is given to the optimal (smallest size or length) coding of a histogram. Information theoretic principles may be applied to obtain a maximum length for lossless and/or lossy encoding of a histogram.

As noted above, for a particular patch (e.g., often referred to as a cell or region), the distribution of gradients in the patch may be represented as a histogram. A histogram may be represented as an alphabet A having a length of m symbols (2≤m≤∞), where each symbol is associated with a bin in the histogram. Therefore, the histogram has a total number of m bins. For example, each symbol (bin) in the alphabet A may correspond to a gradient/orientation from a set of defined gradients/orientations. Here, n may represent the total number of observations, samples, or occurrences (gradient samples in a cell, patch, or region) and k represents the number of observations, samples, or occurrences in a particular bin (e.g., $k_1$ is number of gradient samples in first bin ... $k_m$ is the number of gradient samples in mth bin), such that $$n = \sum_{i=1...m} k_i.$$

That is, the sum of all gradient samples in the histogram bins is equal to the total number of gradient samples in the patch.

Because a histogram may represent a probability distribution for a first distribution of gradient samples within a cell, patch, or region, it is possible that different cells, patches, or regions having a second distribution (different from the first distribution) of gradient samples may nonetheless have the same histogram.

If P denotes an m-ary probability distribution $[p_1, \ldots, p_m]$, the entropy H(P) of this distribution can be defined as:

$$H(P) = -\sum_{i=1}^{m} p_i \log p_i. \tag{4}$$

In this case, the relative entropy D(P∥Q) between two known distributions P and Q is given by $$D(P \| Q) = \sum_{i=1}^{m} p_i \log \frac{p_i}{q_i}. \tag{5}$$

For a given sample w of gradient distributions, assume that the number of times each gradient value appears is given by $k_i$ (for $i=1, \ldots m$). The probability P(w) of the sample w is thus given by:

$$P(w) = \prod_{i=1}^{m} p_i k^i \tag{6}$$

where Π is the product operator.

For example, in the case of a cell or patch, the probability P(w) is a probability of a particular cell or patch.

However, Equation 6 assumes that the distribution P is known. In the case where the source distribution is unknown, as may be the case with typical gradients in a patch, the probability of a sample w may be given by the Krichecvsky-Trofimov (KT) estimate:

$$P_{KT}(w) = \Gamma\left(\frac{m}{2}\right) \frac{\prod_{i=1}^{m} \Gamma\left(k_i + \frac{1}{2}\right)}{\pi^{\frac{m}{2}} \Gamma\left(n + \frac{m}{2}\right)}, \tag{7}$$

where Γ is the Gamma function such that $\Gamma(n)=(n-1)!$.

If the sample w is to be encoded using the KT-estimate of its probability, the length L of such encoding (under actual distribution P) satisfies:

$$L_{KT}(w, P) = -\sum_{w} P(m) \log P_{KT}(w) \sim nH(P) + \frac{m-1}{2} \log n. \tag{8}$$

Equation 8 provides the maximum code length for lossless encoding of a histogram. The redundancy of KT-estimator-based code may be given by:

$$R_{KT}(n) \sim \frac{m-1}{2} \log n, \tag{9}$$

which does not depend on the actual source distribution. This implies that such code is universal. Thus, the KT-estimator provides a close approximation of actual probability P so long as the sample w used is sufficiently long.

Note that the KT-estimator is only one way to compute probabilities for distributions. For example, a maximum likelihood (ML) estimator may also be used.

Also, when coding a histogram, it may be assumed that both the encoder and decoder can determine or are configured with the total number of samples n in the histogram and the number of bins m for the histogram. Thus, in this case, this information need not be encoded. Therefore, the encoding is focused on the number of samples for each of the m bins.

Rather than transmitting the histogram itself as part of the keypoint (or image) descriptor, a compressed form of the histogram may be used. To accomplish this, histograms may be represented by types. Generally, a type is a compressed representation of a histogram (e.g., where the type represents the shape of the histogram rather than full histogram). The type t of a sample w may be defined as:

$$t(w) = \left[\frac{k_1}{n}, \ldots, \frac{k_n}{n}\right] \tag{10}$$

such that the type t(w) represents a set of frequencies of its symbols (e.g., the frequencies of gradient distributions $k_i$). A type can also be understood as an estimate of the true distribution of the source that produced the sample. Thus, encoding and transmission of type t(w) is equivalent to encoding and transmission of the shape of the distribution as it can be estimated based on a particular sample w.

However, traditional encoding techniques have focused on efficiently encoding a sequence of values. Because sequence information is not used in a histogram, efficiently encoding a histogram is a different problem than those addressed by traditional encoding techniques. Assuming the number of bins is known to the encoder and decoder, encoding of histograms involves encoding the total number of points (e.g., gradients) and the points per bin.

Hereafter, one goal is to figure out how to encode type t(w) efficiently. Notice that any given type t may be defined as:

$$t = \left[\frac{k_1}{n}, \ldots, \frac{k_n}{n} : \sum_{i=1}^{m} k_i = n\right]. \tag{11}$$

where $k_1$ to $k_m$ denote the number of possible types t given the total number of samples n. Therefore, the total number of possible sequences with type t can be given by:

$$\xi(t) = \binom{n}{k_1, \ldots, k_m} \tag{12}$$

where ξ(t) is total number of possible arrangements of symbols with a population t.

The total number of possible types is essentially the number of all integers $k_1, \ldots, k_m$ such that $k_1 + \ldots + k_m = n$, and it is given by the multiset coefficient:

$$M(m, n) = \binom{n+m-1}{m-1} \tag{13}$$

The probability of occurrence of any sample w of type t may be denoted by P(t). Since there are ξ(t) such possible samples, and they all have the same probabilities, then:

$$P(t) = \xi(t)P(w:t(w) = t) \qquad (14)$$

$$= \binom{n}{k_1, \ldots, k_m} p_1^{k_1} \ldots p_m^{k_m}$$

This density P(t) may be referred to as a distribution of types. It is clearly a multinomial distribution, with maximum (mode) at:

$$P(t^*) = P(t : k_i = np_i) = \binom{n}{np_1, \ldots, np_m} p_1^{np_1} \ldots p_m^{np_m}. \qquad (15)$$

The entropy of distribution of types is subsequently (by concentration property):

$$H(P(t)) = -\sum_t P(t)\log P(t) \sim \log(P(t^*)) = \frac{m-1}{2}\log n + O(1). \qquad (16)$$

Given a sample w of length n, the task of universal encoder is to design a code f(w) (or equivalently, its induced distribution $P_f(w)$), such that its worst-case average redundancy:

$$R*(n) = \sup_P \left[ \sum_{|w|=n} P(w)|f(w)| - nH(P) \right] \qquad (17)$$

$$\geq \sup_P \sum_{|w|=n} P(w)\log \frac{P(w)}{P_f(w)} = n\sup_P D(P \| P_f) \qquad (18)$$

is minimal. Equations 17 and 18 describe the problem being addressed by universal coding, which given a sequence, a code length is sought where the difference between an average code length and n*H(P) is minimal for all possible input distributions. That is, the minimum worst-case code length is sought without knowing the distribution beforehand.

Since probabilities of samples of the same type are the same, and code induced distribution $P_f(w)$ is expected to retain this property, $P_f(w)$ can be defined as:

$$P_f(w) = \frac{P_f(w:t(w) = t)}{\xi(t)}, \qquad (19)$$

where $P_f(t)$ is the probability of a type t(w) and ξ(t) is the total number of sequences within the same type t(w). The probability $P_f$ of a code assigned to a type t(w) can thus be defined as:

$$P_f(t) = \xi(t)P_f(w:t(w)=t) \qquad (20)$$

is code-induced distribution of types.

By plugging such decomposition in Equation 18 and changing the summation to go over types (instead of individual samples), the average redundancy R*(n) may be defined as:

$$R*(n) \geq \sup_P \sum_{|w|\in A^n} P(w)\log \frac{P(w)}{P_f(w)} \qquad (21.1)$$

$$= \sup_P \left[ \sum_t \sum_{w:t(w)=t} P(w)\log \frac{P(t)}{P_f(t)} \right] \qquad (21.2)$$

$$= \sup_P \left[ \sum_t P(t)\log \frac{P(t)}{P_f(t)} \right] \qquad (21.3)$$

$$= \sup_P D(P(t) \| P_f(t)), \qquad (21.4)$$

where "sup" is the supreme operator, where a value is a supreme with respect to a set if it is at least as large as any element of that set. These equations mean that the problem of coding of types is equivalent to the problem of minimum redundancy universal coding.

Consequently, the problem of lossless coding of types can be asymptotically optimally solved by using KT-estimated distribution of types:

$$P_{KT}(t) = \xi(t)P_{KT}(w:t(w) = t) \qquad (22.1)$$

$$= \binom{n}{k_1, \ldots, k_m} \Gamma\left(\frac{m}{2}\right) \frac{\prod_{i=1}^{m} \Gamma\left(k_1 + \frac{1}{2}\right)}{\pi^{\frac{m}{2}} \Gamma\left(n + \frac{m}{2}\right)} \qquad (22.2)$$

Based on this Equation 22.2, it becomes clear that types with near uniform populations fall in the valleys of the estimated density, while types with singular populations (ones with zero counts) become its peaks.

FIG. 5 is a line drawing of a chart 180 illustrating an example keypoint distribution across various Gaussian scale spaces. The data for graph 180 was generated from a set of training images, namely, 105 images with 700 by 1000 pixel resolution. For each image, data was collected for scales of 1.0 (graph 186), 0.75 (graph 188), 0.5 (graph 190), and 0.25 (graph 192). Chart 180 shows a typical distribution of keypoints across the scale space. Based on this observation, control unit 20 (FIG. 1) may calculate a statistic that allows estimation of the scaling factor of an image.

X-axis 184 of graph 180 represents the possible scale indexes and corresponding scales in the Gaussian scale space (GSS) for this particular example set of data. Y-axis 182 represents the number of keypoints for this example.

For a natural image, there may be a distribution of the detected key points with respect to the scale parameter along the Gaussian scale space, as shown. Keypoints detected at higher scales generally correspond to larger features. As the image resolution decreases (as the user goes farther away from target, for example), finer details are reduced and details which were detected at higher scales (corresponding to coarse details) move to lower scales (corresponding to finer details). Most of the keypoints, therefore, will fall in the lower scales. A histogram of keypoints built with the scale space levels as bin centers may have the characteristic that as the image size decreases, most of the area of the histogram may be concentrated in the lower bin centers. In effect, this means that the distribution of keypoints in scale space is texture-dependent, which in turns changes according to the distance of the camera from the object.

A number of objects can appear in a given scene, each at its own distance from the camera and therefore at a unique scale. In order to properly assess the scale associated with an object with which the user wants to interact, some rough segmentation may be performed to isolate the object from others in the image, and to make localized inferences about the scale of the object. This can be accomplished, for example, by using a dynamic window, or other algorithms that approximately delineate boundaries between object regions.

In order to calculate a cutoff scale that can be used to determine a minimum octave of a database to search, scale estimation unit 24 may estimate the distribution of keypoints over scale space levels s, with a histogram of keypoints P(s). Next, scale estimation unit 24 may estimate the cutoff scale $s_c$ such that approximately 90% of the keypoints are preserved within the scale levels up to $s_c$. Formally, scale estimation unit 24 may calculate formula (23) below:

$$\sum_{s=1}^{S_c} P(s) = 0.9 * \sum_{s=1}^{S} P(s) \quad (23)$$

Then, scale estimation unit 24 may estimate a function that maps the tracked scale space cutoff level to an image scaling factor, Y. That is, scale estimation unit 24 may calculate:

$$Y = f(s_c) \quad (24)$$

where Y is the image scaling factor and $s_c$ is the cutoff scale space level. To learn the function, scale estimation unit 24 may pick Y and $s_c$ data points from the most repeated path, e.g., one of graphs 186, 188, 190, or 192.

In general, as the image resolution increases, $s_c$ moves further up in the scale space, and vice versa. Graph 180 also illustrates example cutoff scales (corresponding to minimum octaves) for scales of 1.0 (point 198), 0.75 (point 196), and 0.5 (point 194) in this example data set. It can be seen from this example that as the resolution decreases, the cutoff scale moves towards the left. That is, as the resolution decreases, the cutoff scale decreases.

Figure 6:
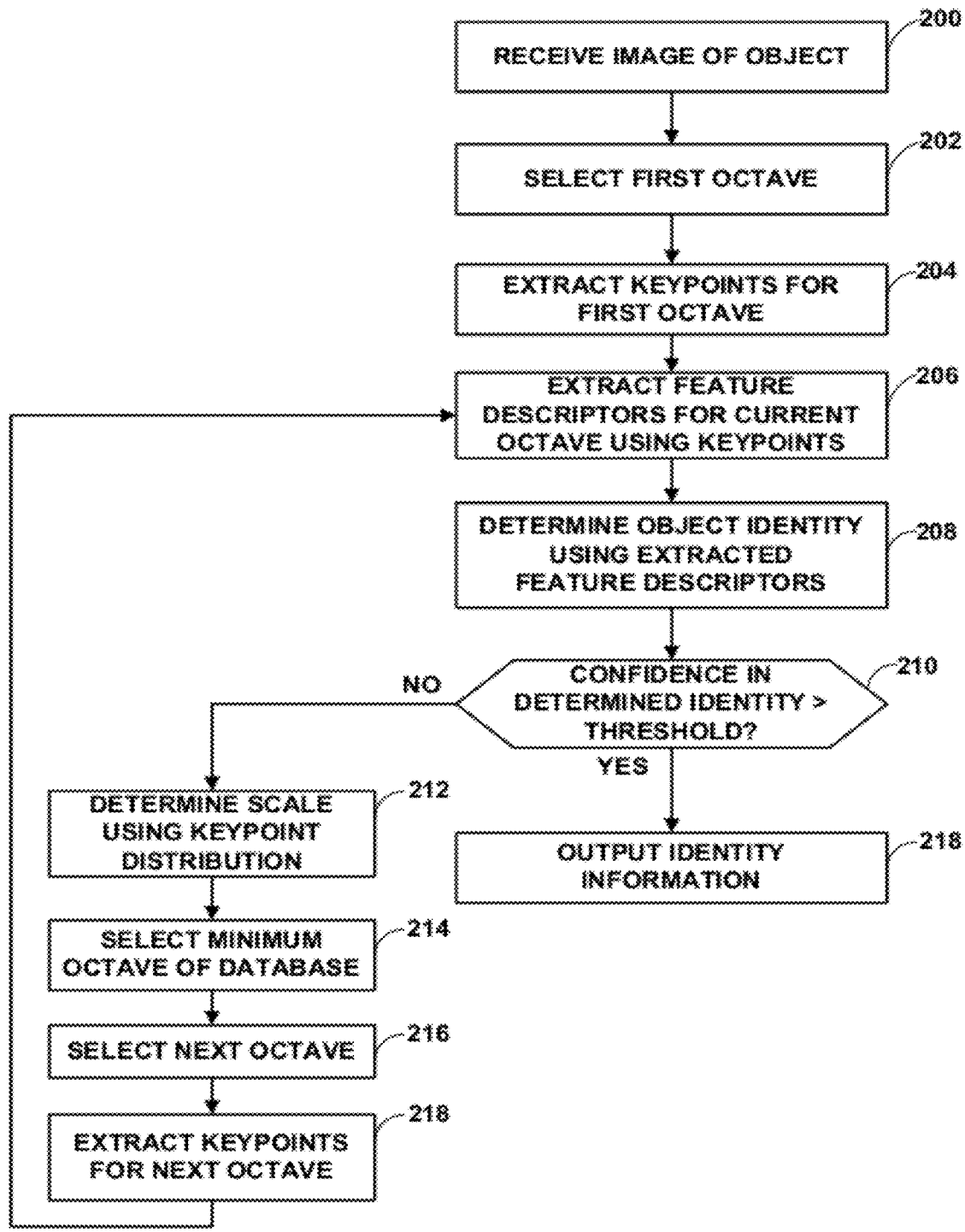
FIG. 6 is a flowchart illustrating an example method for performing incremental feature descriptor extraction.

FIG. 6 is a flowchart illustrating an example method for performing incremental feature descriptor extraction. For purposes of explanation, the method of FIG. 6 is described with respect to the components of client device 10. However, it should be understood that the method of FIG. 6 may be performed by other devices, or performed jointly by various devices. For example, control unit 60 of server device 50 (FIG. 1) may be configured to perform the method of FIG. 6. Likewise, additional steps may be performed, or certain steps omitted, and steps of the method may be performed in a different order (or in parallel) without departing from the techniques of this disclosure.

In the example of FIG. 6, initially, control unit 20 receives an image (also referred to as a query image) of an object (200). For example, control unit 20 may receive the image from camera 12. Alternatively, control unit 20 may retrieve a stored image from a memory of client device 10. Feature extraction unit 22 of control unit 20 may then select a first octave for the image from which to extract feature descriptors (202).

Feature extraction unit 22 may select the first octave using any of a variety of techniques, including combinations of techniques, as discussed in this disclosure. For example, feature extraction unit 22 may receive data from sensors 14, which feature extraction unit 22 may use to select the first octave. Feature extraction unit 22 may, for example, receive location data from a GPS unit of sensors 14, indicative of a location of client device 10. Feature extraction unit 22 may use the location data to determine locations of objects near client device 10. Feature extraction unit 22 may use objects near client device 10 to approximate a scale for an object in the image.

For example, if the GPS data indicates that client device 10 is in Paris, France and near the Eiffel tower, then feature extraction unit 22 may determine that the likely scale of the object in the image is relatively large. This determination may be based on an assumption (through configuration data) that the image is of the Eiffel tower, which may be confirmed through feature descriptor extraction and comparison. On the other hand, if the GPS data indicates that client device 10 is in Paris, France and near or inside the Louvre, then feature extraction unit 22 may determine that the likely scale of the object in the image is relatively small. This determination may be based on an assumption (through configuration data) that the image is of a work kept in the Louvre, in this example.

In addition to, or in the alternative to, location data from a GPS unit or other types of sensed data, control unit 20 may select the first octave based on a depth map calculated by depth estimation unit 26. Depth estimation unit 26 may use any of a variety of techniques for calculating the depth map. For example, depth estimation unit 26 may analyze horizontal disparity (or parallax) between pixels of two or more images captured by stereo cameras. One of these images may correspond to the query image. Based on depth for an object in the query image, control unit 20 may determine a scale for the object, which may correspond to the first octave. Other factors that may influence the first octave include, for example, a loxel in which the object is present in the image, whether a wireless network is available (e.g., whether a wireless access point is in range), whether a scale had been determined for a previous, recent query image that the tracker since lost, or other factors.

After determining the first octave, feature extraction unit 22 may extract keypoints for the first octave (204). As discussed above, feature extraction unit 22 may calculate an image for the first octave from the query image by scaling the resolution of the query image to the size corresponding to the first octave, as selected above. Feature extraction unit 22 may then apply Gaussian blur filters to the first octave image of varying degrees, and calculate a difference of Gaussian pyramid from which to extract the keypoints. Using the keypoints, feature extraction unit 22 may extract one or more feature descriptors for the first octave of the query image (206).

Feature extraction unit 22 may then attempt to determine the identity of the object in the query image using the feature descriptors (208). In some examples, control unit 20 may retrieve all or a portion of remote object database 52 and store the data locally as local object database 30. In other examples, control unit 20 may send one or more of the extracted feature descriptors to server device 50 via network 40. Feature matching unit 62 may determine whether any or all of the feature descriptors received from client device 10 match an object of remote object database 52. Feature matching unit 62 may determine one or more matches to the feature descriptors. If feature matching unit 62 has received an indication of a minimum octave to search, feature matching unit 62 may search only feature descriptors for octaves at or above the minimum octave, but not below the specified minimum octave. Confidence valuation unit 64 may then determine a confidence value for each of the matches, representative of how well the matches fit the feature descriptors. Control unit 60 may then send information including identifiers for each of the determined matches and the respective confidence values to client device 10 via network 40.

After receiving the information from server device 50, control unit 20 of client device 10 may determine whether any of the confidence values for the various determined identities of objects exceeds a threshold value (210). For example, control unit 20 may determine whether a largest confidence value exceeds the threshold. If the largest confidence value does not exceed the threshold ("NO" branch of 210), control unit 20 may determine a next octave from which to extract feature descriptors, as described below, as well as a cutoff scale (also referred to as a minimum octave) of the database being queried in some examples.

Scale estimation unit 24 may determine which scale fits the keypoint distribution most closely, then determine that the best fitting scale is most likely the scale of the object (212). Based on this approximation of the scale, feature extraction unit 22 may select a minimum octave in the database to which to compare extracted feature descriptors (214). Feature extraction unit 22 may also select a next octave from which to extract keypoints (216). Feature extraction unit 22 may then extract keypoints for this next determined octave (218) and use the extracted keypoints to extract feature descriptors for the current octave (206). Feature extraction unit 22 may then again determine an object identity using the extracted feature descriptors (208). In particular, feature extraction unit 22 may cause the database to search objects in octaves of the database at or above the selected minimum octave using the extracted feature descriptors, and receive a new confidence value in a determined identity of the object.

When the confidence value in the determined identity of the object exceeds the threshold ("YES" branch of 210), feature extraction unit 22 may output identity information for the object in the image (218). In some examples, feature extraction unit 22 may interact with a web browser executed by control unit 20, to cause the web browser to submit a search query to an Internet-based search engine, using the determined identity as a search term or keyword. The search may cause the web browser to display various information for the object in the image, such as, for example, another image of the object, location information for the object (e.g., if the object is a landmark), price information (e.g., if the object or a replica thereof can be purchased), a link to a web address (e.g., uniform resource locator (URL)) with more information for the object, or other such information.

In this manner, FIG. 6 represents an example of a method including extracting a first set of one or more keypoints from a first set of blurred images of a first octave of a received image, calculating a first set of one or more descriptors for the first set of keypoints, receiving a confidence value for a result produced by querying a feature descriptor database with the first set of descriptors, wherein the result comprises information describing an identity of an object in the received image, and extracting a second set of one or more keypoints from a second set of blurred images of a second octave of the received image when the confidence value does not exceed a confidence threshold.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, tangible computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of determining identities for objects in an image, the method comprising:
   extracting a first set of one or more keypoints from a first set of blurred images of a first octave of a received image;
   calculating a first set of one or more descriptors for the first set of keypoints;

receiving a confidence value for a result produced by querying a feature descriptor database with the first set of descriptors, wherein the result comprises information describing an identity of an object in the received image; and extracting a second set of one or more keypoints from a second set of blurred images of a second octave of the received image when the confidence value does not exceed a confidence threshold.

2. The method of claim 1, further comprising:
determining that the confidence value does not exceed the confidence threshold;
extracting the second set of keypoints from a second set of blurred images of the second octave based on the determination;
calculating a second set of one or more descriptors from the second set of keypoints; and
querying the feature descriptor database with a set of descriptors comprising the first set of descriptors and the second set of descriptors.

3. The method of claim 1, further comprising:
estimating a scale value for the object in the received image;
selecting a minimum octave of the feature descriptor database based on the estimated scale; and
providing an indication of a minimum octave in the feature descriptor database to cause a search of the feature descriptor database to search feature descriptors at or above the selected minimum octave in the feature descriptor database.

4. The method of claim 3, wherein estimating the scale value comprises:
analyzing a distribution of the first set of keypoints across a scale space;
determining a cutoff point corresponding to a scale level in the distribution such that approximately 90% of the keypoints fall below the scale level; and
estimating the scale value as a function of the determined cutoff point.

5. The method of claim 3, further comprising obtaining depth information for the object, wherein estimating the scale value comprises estimating the scale value based at least in part on the depth information for the object.

6. The method of claim 1, further comprising:
analyzing sensor information from one or more sensors associated with a camera that captured the received image; and
determining an octave level for at least one of the first octave and the second octave based on the analysis of the sensor information.

7. The method of claim 6, wherein analyzing the sensor information comprises analyzing global positioning system (GPS) information to determine whether the camera was located in an outdoor environment when the received image was captured.

8. The method of claim 6, wherein analyzing the sensor information comprises analyzing GPS information to determine locations of objects relatively near the camera when the received image was captured, and determining sizes for the objects from descriptive data for the objects.

9. The method of claim 6, wherein analyzing the sensor information comprises determining whether the camera was located in an indoor environment based on network data indicative of whether a device comprising the camera was communicatively coupled to a wireless network when the received image was captured.

10. The method of claim 6, wherein analyzing the sensor information comprises calculating depth information indicative of distances between one or more objects in the received image and the camera when the received image was captured.

11. The method of claim 6, wherein analyzing sensor information comprises estimating a depth value for the object using data provided by an active probing sensor.

12. The method of claim 1, further comprising sending the one or more descriptors to a server to cause the server to query the feature descriptor database using the one or more descriptors, wherein receiving the confidence value comprises receiving the confidence value from the server in response to the query.

13. An apparatus for determining identities for objects in an image, the apparatus comprising a processor configured to extract a first set of one or more keypoints from a first set of blurred images of a first octave of a received image, calculate a first set of one or more descriptors for the first set of keypoints, receive a confidence value for a result produced by querying a feature descriptor database with the first set of descriptors, wherein the result comprises information describing an identity of an object in the received image, and extract a second set of one or more keypoints from a second set of blurred images of a second octave of the received image when the confidence value does not exceed a confidence threshold.

14. The apparatus of claim 13, further comprising a camera configured to capture the image and to provide the image to the processor.

15. The apparatus of claim 13, wherein the processor is further configured, when the processer determines that the confidence value does not exceed the confidence threshold, to extract the second set of keypoints from a second set of blurred images of the second octave based on the determination, calculate a second set of one or more descriptors from the second set of keypoints, and query the feature descriptor database with a set of descriptors comprising the first set of descriptors and the second set of descriptors.

16. The apparatus of claim 15, wherein the processor is further configured to estimate a scale value for the object in the received image, select a minimum octave of the feature descriptor database based on the estimated scale, and search descriptors in the feature descriptor database, wherein the searched descriptors correspond to octaves in the feature descriptor database at or above the selected minimum octave.

17. The apparatus of claim 16, wherein to estimate the scale value, the processor is configured to analyze a distribution of the first set of keypoints across a scale space, determine a cutoff point corresponding to a scale level in the distribution such that approximately 90% of the keypoints fall below the scale level, and calculate the scale value as a function of the determined cutoff point.

18. The apparatus of claim 16, further comprising a depth estimation unit configured to obtain depth information for the object, wherein the processor is configured to estimate the scale value based at least in part on the depth information for the object.

19. The apparatus of claim 13, wherein the processor is further configured to analyze sensor information from one or more sensors associated with a camera that captured the received image, and determine an octave level for at least one of the first octave and the second octave based on the analysis of the sensor information.

20. The apparatus of claim 19, further comprising a global positioning system (GPS) unit configured to determine location information for the apparatus, wherein to analyze the sensor information, the processor is configured to determine whether the camera was located in an outdoor environment when the received image was captured based on the location information determined by the GPS unit.

21. The apparatus of claim 19, further comprising a GPS unit configured to determine location information relative to the apparatus, wherein to analyze the sensor information, the processor is configured to analyze the location information determined by the GPS unit to determine locations of objects relatively near the camera when the received image was captured, and to determine sizes for the objects from descriptive data for the objects.

22. The apparatus of claim 19, further comprising a wireless network interface, wherein to analyze the sensor information, the processor is configured to determine whether the camera was located in an indoor environment based on network data indicative of whether the wireless network interface was communicatively coupled to a wireless network when the received image was captured.

23. The apparatus of claim 19, further comprising a camera array comprising at least two cameras including the camera that captured the received image, wherein to analyze the sensor information, the processor is configured to calculate depth information from images captured by the camera array indicative of distances between one or more objects in the received image and the camera when the received image was captured.

24. The apparatus of claim 19, wherein the one or more sensors comprise an active probing sensor configured to estimate a depth value for the object.

25. The apparatus of claim 13, wherein the processor is configured to send the one or more descriptors to a server to cause the server to query the feature descriptor database using the one or more descriptors, and to receive the confidence value from the server in response to the query.

26. The apparatus of claim 13, wherein the apparatus comprises at least one of:
an integrated circuit;
a microprocessor; and
a wireless communication device that includes the processor.

27. An apparatus for determining identities for objects in an image, the apparatus comprising:
means for extracting a first set of one or more keypoints from a first set of blurred images of a first octave of a received image;
means for calculating a first set of one or more descriptors for the first set of keypoints;
means for receiving a confidence value for a result produced by querying a feature descriptor database with the first set of descriptors, wherein the result comprises information describing an identity of an object in the received image; and
means for extracting a second set of one or more keypoints from a second set of blurred images of a second octave of the received image when the confidence value does not exceed a confidence threshold.

28. The apparatus of claim 27, further comprising:
means for determining that the confidence value does not exceed the confidence threshold;
means for extracting the second set of keypoints from a second set of blurred images of the second octave based on the determination;
means for calculating a second set of one or more descriptors from the second set of keypoints; and
means for querying the feature descriptor database with a set of descriptors comprising the first set of descriptors and the second set of descriptors.

29. The apparatus of claim 28, further comprising:
means for estimating a scale value for the object in the received image;
means for selecting a minimum octave of the feature descriptor database based on the estimated scale; and
means for providing an indication of a minimum octave in the feature descriptor database to cause a search of the feature descriptor database to search feature descriptors at or above the selected minimum octave in the feature descriptor database.

30. The apparatus of claim 29, wherein the means for estimating the scale value comprises:
means for analyzing a distribution of the first set of keypoints across a scale space;
means for determining a cutoff point corresponding to a scale level in the distribution such that approximately 90% of the keypoints fall below the scale level; and
means for estimating the scale value as a function of the determined cutoff point.

31. The apparatus of claim 29, further comprising means for obtaining depth information for the object, wherein the means for estimating the scale value comprises means for estimating the scale value based at least in part on the depth information for the object.

32. The apparatus of claim 27, further comprising:
means for analyzing sensor information from one or more sensors associated with a camera that captured the received image; and
means for determining an octave level for at least one of the first octave and the second octave based on the analysis of the sensor information.

33. The apparatus of claim 32, further comprising means for receiving global positioning system (GPS) information, wherein the means for analyzing the sensor information comprises means for analyzing the GPS information to determine whether the camera was located in an outdoor environment when the received image was captured.

34. The apparatus of claim 32, further comprising means for receiving GPS information, wherein the means for analyzing the sensor information comprises:
means for analyzing the GPS information to determine locations of objects relatively near the camera when the received image was captured; and
means for determining sizes for the objects from descriptive data for the objects.

35. The apparatus of claim 32, further comprising means for communicating via at least one wireless network protocol, wherein the means for analyzing the sensor information comprises means for determining whether the camera was located in an indoor environment based on network data indicative of whether the means for communicating via the wireless network protocol was communicatively coupled to a wireless network when the received image was captured.

36. The apparatus of claim 32, further comprising means for capturing two or more images of a scene, wherein one of the two or more images comprises the received image, and wherein the means for analyzing the sensor information comprises means for calculating depth information from the two or more images of the scene indicative of distances between one or more objects in the received image and the camera when the received image was captured.

37. The apparatus of claim 32, wherein the means for analyzing the sensor information comprises means for estimating a depth value for the object using data provided by an active probing sensor.

38. The apparatus of claim 27, further comprising means for sending the one or more descriptors to a server to cause the server to query the feature descriptor database using the one or more descriptors, wherein the means for receiving the confidence value comprises means for receiving the confidence value from the server in response to the query.

39. A computer program product comprising a non-transitory computer-readable medium having stored thereon instructions that, when executed, cause a processor to:
   extract a first set of one or more keypoints from a first set of blurred images of a first octave of a received image;
   calculate a first set of one or more descriptors for the first set of keypoints;
   receive a confidence value for a result produced by querying a feature descriptor database with the first set of descriptors, wherein the result comprises information describing an identity of an object in the received image; and
   extract a second set of one or more keypoints from a second set of blurred images of a second octave of the received image when the confidence value does not exceed a confidence threshold.

40. The computer program product of claim 39, further comprising instructions that cause the processor to:
   determine that the confidence value does not exceed the confidence threshold;
   extract the second set of keypoints from a second set of blurred images of the second octave based on the determination;
   calculate a second set of one or more descriptors from the second set of keypoints; and
   query the feature descriptor database with a set of descriptors comprising the first set of descriptors and the second set of descriptors.

41. The computer program product of claim 40, further comprising instructions that cause the processor to:
   estimate a scale value for the object in the received image;
   select a minimum octave of the feature descriptor database based on the estimated scale; and
   provide an indication of a minimum octave in the feature descriptor database to cause a search of the feature descriptor database to search feature descriptors at or above the selected minimum octave in the feature descriptor database.

42. The computer program product of claim 41, wherein the instructions that cause the processor to estimate the scale value comprise instructions that cause the processor to:
   analyze a distribution of the first set of keypoints across a scale space;
   determine a cutoff point corresponding to a scale level in the distribution such that approximately 90% of the keypoints fall below the scale level; and
   estimate the scale value as a function of the determined cutoff point.

43. The computer program product of claim 41, further comprising instructions that cause the processor to obtain depth information for the object, wherein the instructions that cause the processor to estimate the scale value comprise instructions that cause the processor to estimate the scale value based at least in part on the depth information for the object.

44. The computer program product of claim 39, further comprising instructions that cause the processor to:
   analyze sensor information from one or more sensors associated with a camera that captured the received image; and
   determine an octave level for at least one of the first octave and the second octave based on the analysis of the sensor information.

45. The computer program product of claim 44, wherein the instructions that cause the processor to analyze the sensor information comprises instructions that cause the processor to analyze global positioning system (GPS) information to determine whether the camera was located in an outdoor environment when the received image was captured.

46. The computer program product of claim 44, wherein the instructions that cause the processor to analyze the sensor information comprises instructions that cause the processor to analyze GPS information to determine locations of objects relatively near the camera when the received image was captured, and determine sizes for the objects from descriptive data for the objects.

47. The computer program product of claim 44, wherein the instructions that cause the processor to analyze the sensor information comprises instructions that cause the processor to determine whether the camera was located in an indoor environment based on network data indicative of whether a device comprising the camera was communicatively coupled to a wireless network when the received image was captured.

48. The computer program product of claim 44, wherein the instructions that cause the processor to analyze the sensor information comprises instructions that cause the processor to calculate depth information indicative of distances between one or more objects in the received image and the camera when the received image was captured.

49. The computer program product of claim 44, wherein the instructions that cause the processor to analyze the sensor information comprise instructions that cause the processor to estimate a depth value for the object using data provided by an active probing sensor.

50. The computer program product of claim 39, further comprising instructions that cause the processor to send the one or more descriptors to a server to cause the server to query the feature descriptor database using the one or more descriptors, wherein the instructions that cause the processor to receive the confidence value comprise instructions that cause the processor to receive the confidence value from the server in response to the query.

* * * * *